United States Patent [19]
Tsurumi et al.

[11] Patent Number: 5,903,404
[45] Date of Patent: May 11, 1999

[54] HIGH DENSITY DISK UNIT AND DISK MEDIUM

[75] Inventors: Hiroshi Tsurumi; Shuichi Hashimoto, both of Kawasaki, Japan

[73] Assignee: Fujitsu Limited, Kawasaki, Japan

[21] Appl. No.: 08/753,444

[22] Filed: Nov. 25, 1996

[30] Foreign Application Priority Data

Dec. 15, 1995 [JP] Japan ..................................... 7-327629

[51] Int. Cl.⁶ ...................................................... B07B 1/28
[52] U.S. Cl. ...................... 360/48; 360/77.04; 360/77.08
[58] Field of Search ........................... 360/48, 77, 77.08, 360/77.04, 75, 49

[56] References Cited

U.S. PATENT DOCUMENTS

| | | | |
|---|---|---|---|
| 4,511,938 | 4/1985 | Betts | 360/77 |
| 4,825,310 | 4/1989 | Song | 360/77.08 |
| 5,422,760 | 6/1995 | Abbott et al. | 360/46 |
| 5,596,460 | 1/1997 | Greenberg et al. | 360/78.14 |
| 5,623,474 | 4/1997 | Oshio et al. | 369/124 |
| 5,715,105 | 2/1998 | Katayama et al. | 360/48 |

FOREIGN PATENT DOCUMENTS

| | | |
|---|---|---|
| 5174498 | 6/1993 | Japan . |
| 6309821 | 11/1994 | Japan . |

*Primary Examiner*—Aristotelis M. Psitos
*Assistant Examiner*—Joseph M. Vann
*Attorney, Agent, or Firm*—Greer, Burns & Crain, Ltd.

[57] ABSTRACT

A high-density disk unit and disk medium are disclosed. Track ID information is not placed in a servo area, or if some track ID information is placed therein, a necessary minimum is placed. The servo area is thus reduced in order to improve formatting efficiency.

A data side of a disk medium is divided into a servo area and a data area in units of a sector. A track ID area in which track information is recorded is defined at the start position of the data area immediately following the servo area. A formatter circuit allows a write data modulation circuit to write track information in the track ID area during track formatting. For writing in the data area, the formatter circuit allows a read data demodulation circuit to read data from the track ID area. Track information is thus detected, and writing tracking is assured.

22 Claims, 15 Drawing Sheets

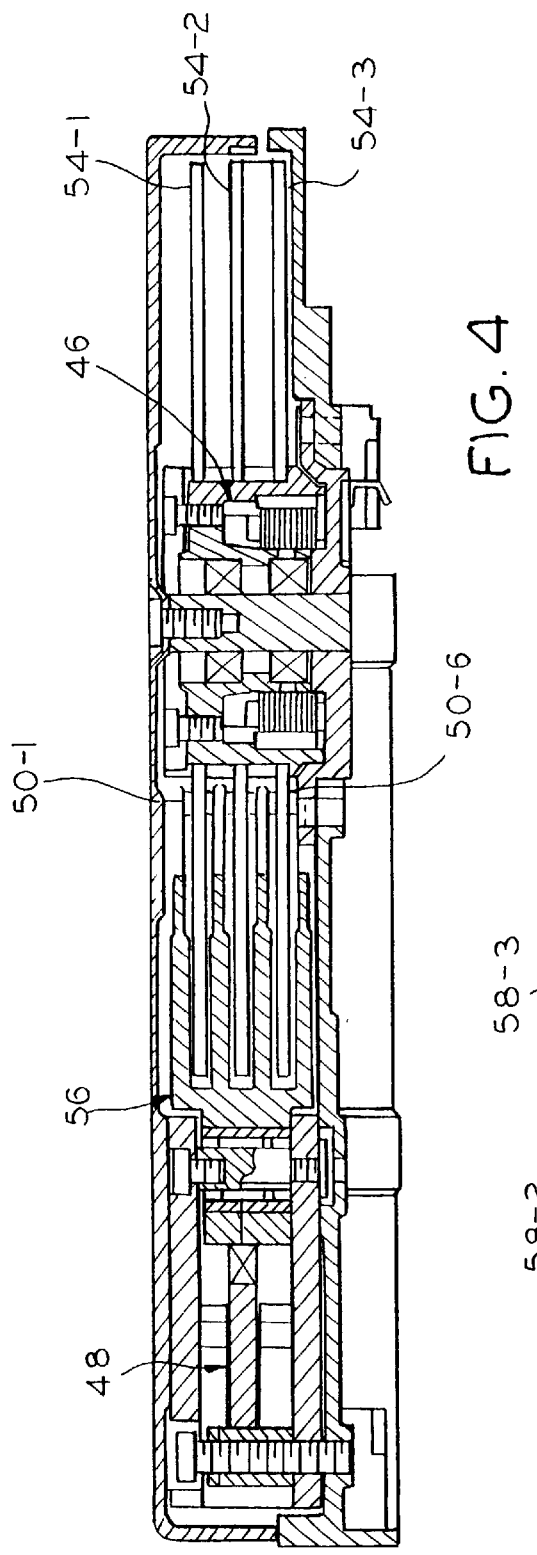
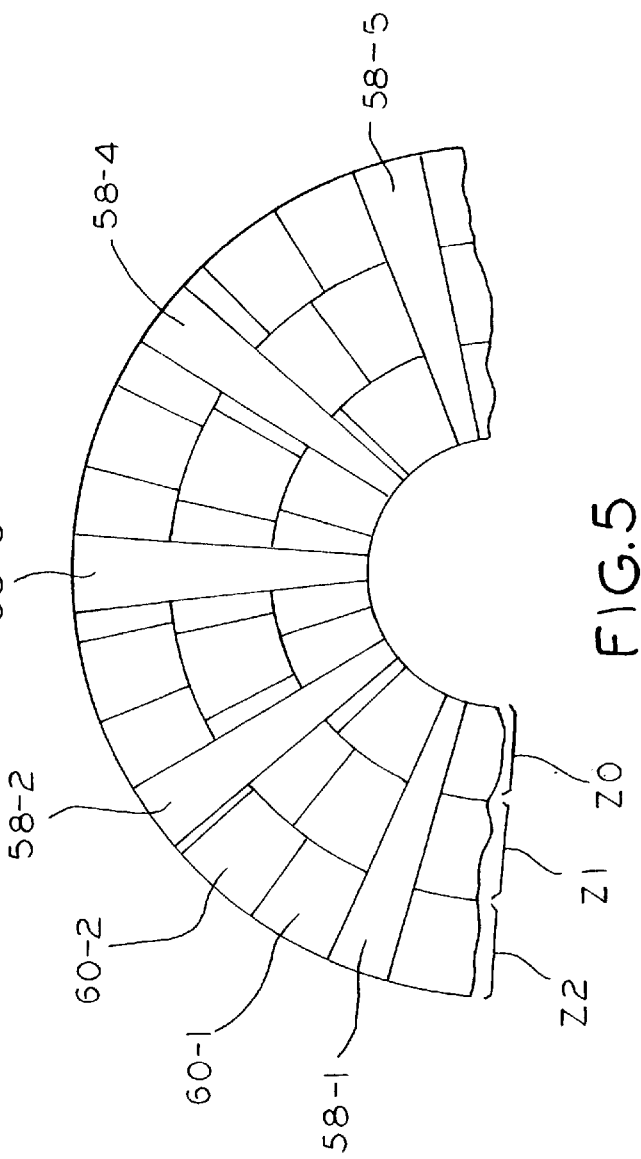
FIG. 4
FIG. 5

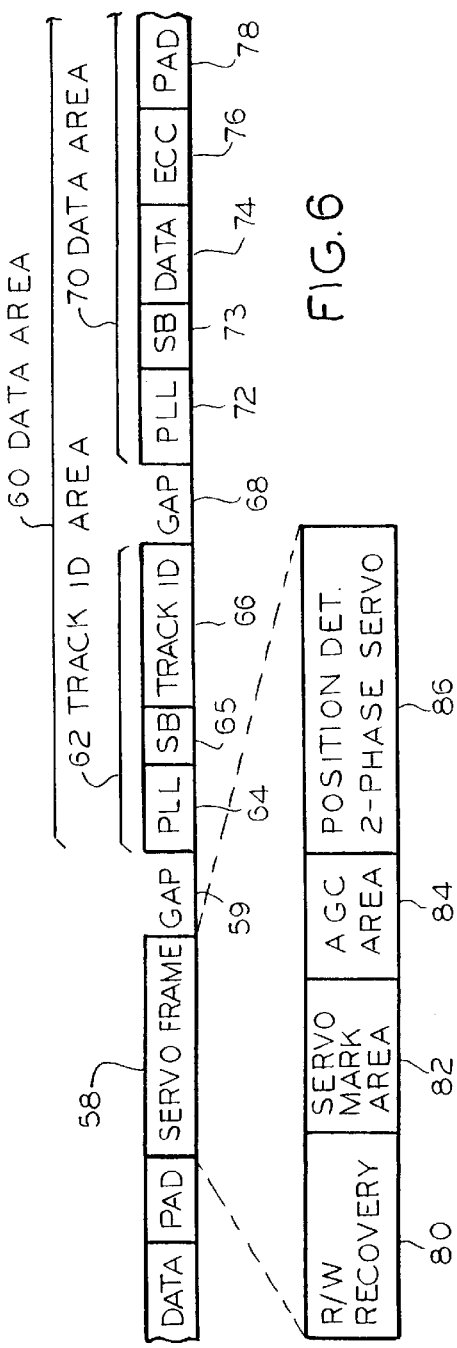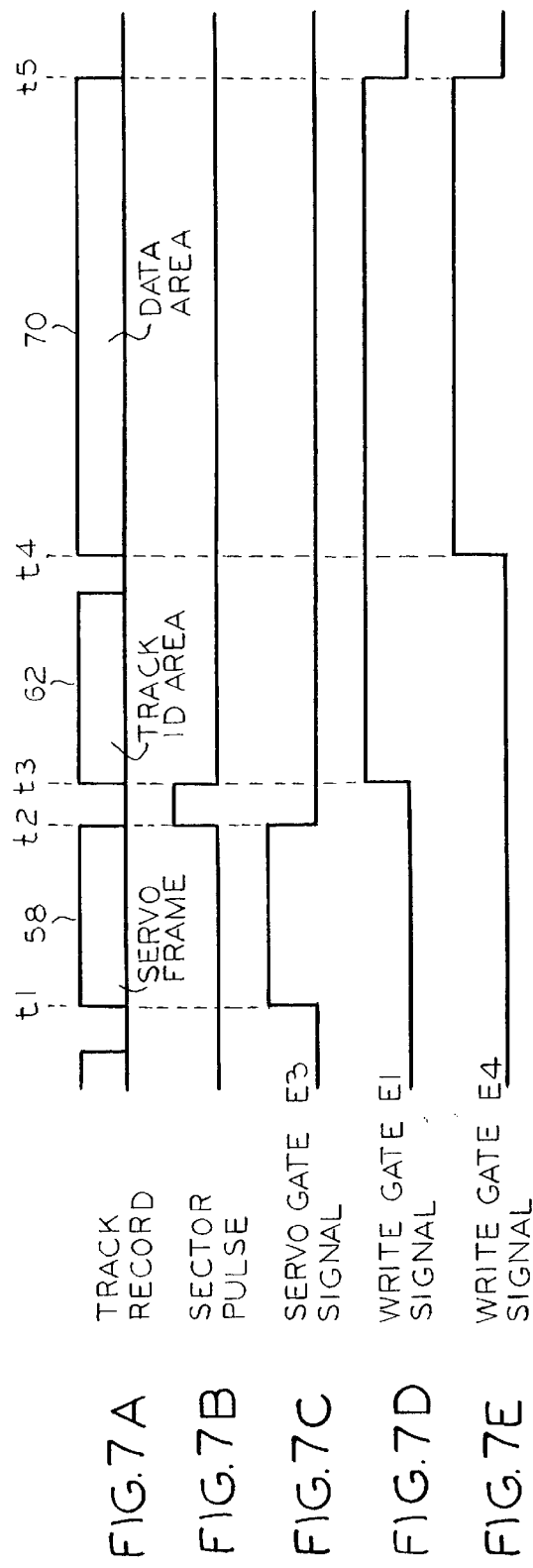
FIG. 6
FIG. 7A TRACK RECORD
FIG. 7B SECTOR PULSE
FIG. 7C SERVO GATE SIGNAL E3
FIG. 7D WRITE GATE SIGNAL E1
FIG. 7E WRITE GATE SIGNAL E4

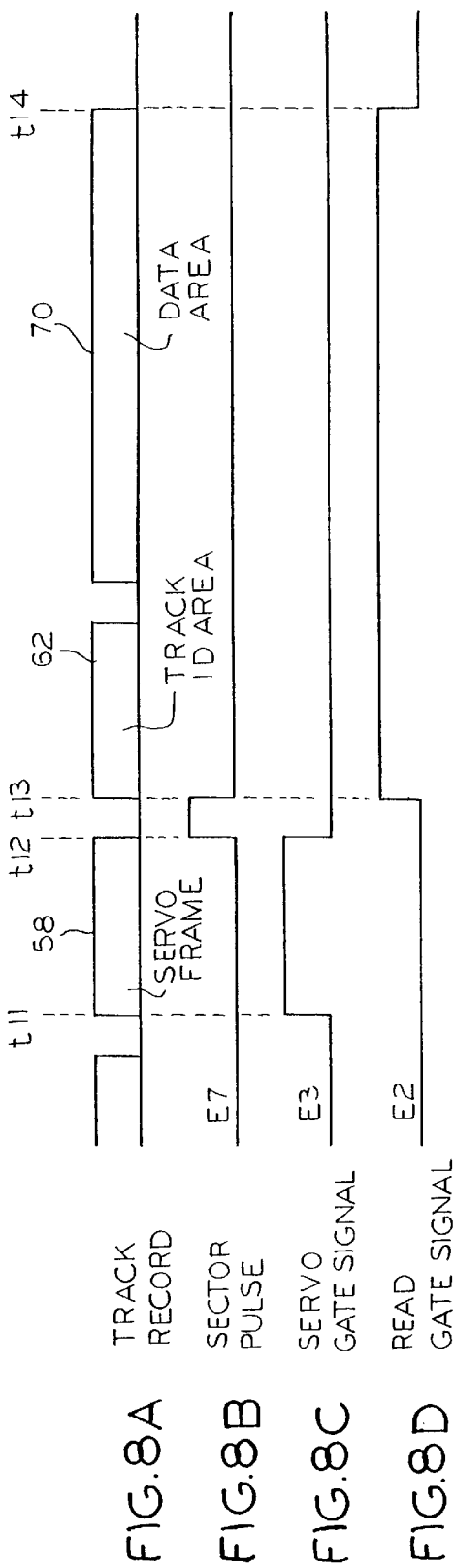
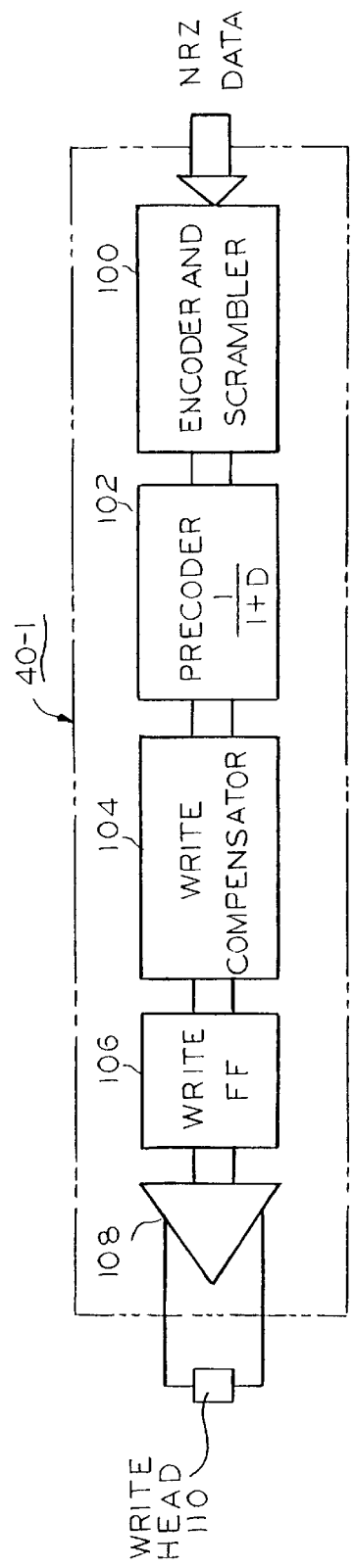

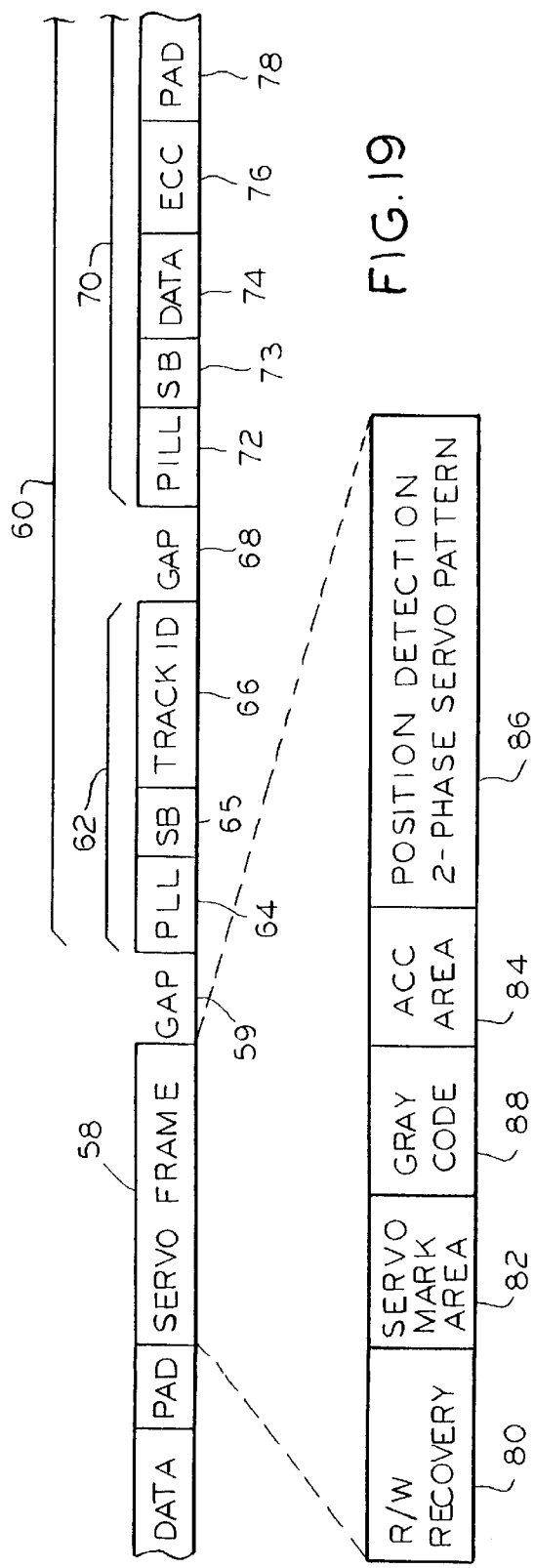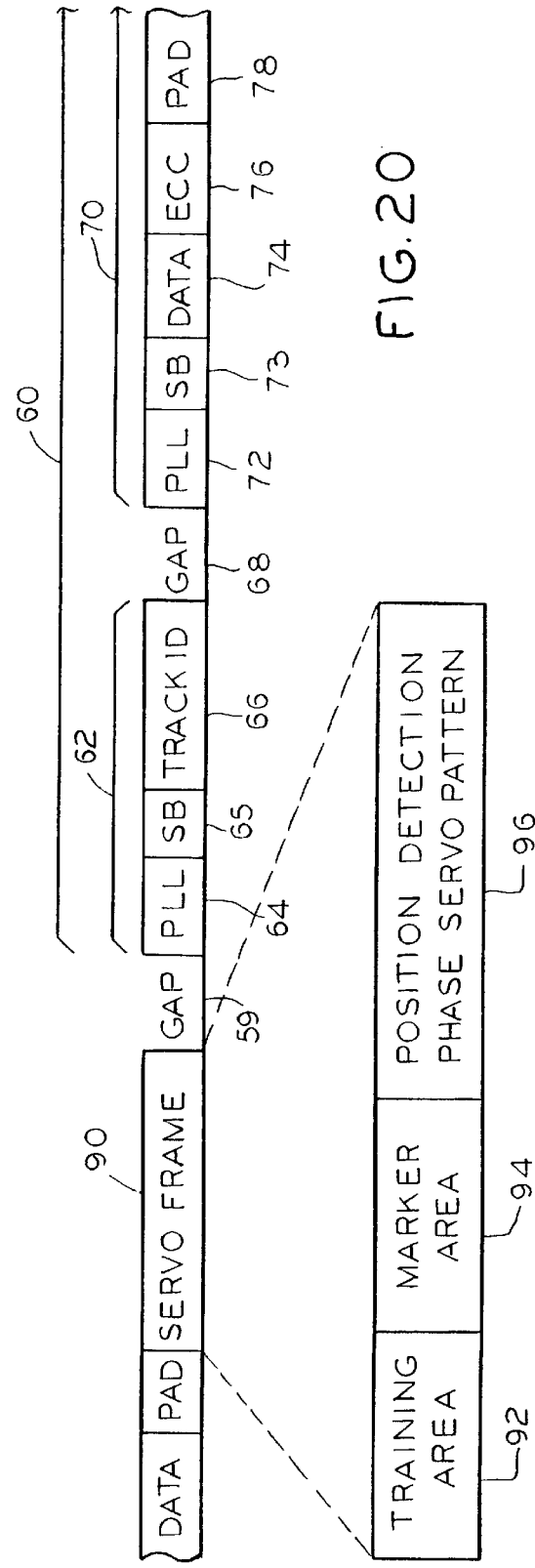

HIGH DENSITY DISK UNIT AND DISK MEDIUM

The present invention relates to a disk unit having an embedded servo in which servo frames are separately arranged on a data side of a disk in order to record servo information. More particularly, this invention is concerned with a disk unit and disk medium in which each servo frame does not include track ID information, or includes only part of the track ID information, and track ID information is recorded in data areas following the servo frames.

BACKGROUND OF THE INVENTION

In recent years, magnetic disk units using a disk medium of 3.5 inches or smaller have become popular due to demand for compact disk units. As for disk media having a relatively small size, such as 3.5 inches or 2.5 inches, contradictory demands are placed on designers because there is high demand for large storage capacity and a simultaneous demand for a thin appearance. In order to raise storage capacity per disk, both bit recording density and track density must be increased at the same time. One way to increase bit recording density is to improve the head or medium, and modify modulation and demodulation circuits. To increase track density, head positioning accuracy must be increased.

With conventional head positioning, one side of a medium is regarded as a dedicated servo side. A servo head is placed over the servo side, and data heads on other media sides are positioned according to position information of the servo side read by the servo head. This is sometimes referred to as a servo side servo. However, this method can have problems because a mechanical mismatch may occur between the servo head and data head. This mismatch is generally referred to as an off-track. As the track density increases, this becomes a greater problem due to interference with adjoining tracks.

In order to resolve this off-track problem, it has become popular to make disk units having an embedded servo (sometimes called a sector servo) in which servo information is arranged at regular intervals in the form of sectors on the data side. When an embedded servo is used, a data reading head is used for positioning. Compared with the servo side servo, off-track can therefore be reduced significantly. Consequently, track density can be increased much more greatly than that permitted by the servo side servo.

Other disk units are available in which a MR head for reading and an inductive head for writing are mounted unitedly as a head capable of recording and reproducing information at a higher density. The MR head has a write gap and a separately formed read gap. Due to the orientation of the head positioned on an inner side of a disk and that of the head positioned on an outer side thereof, the centers of a write core and read core with respect to the track direction do not match with each other. An off-track therefore occurs between writing and reading. This is referred to as a yaw off-track caused by a rotary head actuator.

According to a track format (called a fixed-length block address format) based on the conventional embedded servo, the tracks have three areas: a servo area, an ID area, and a data area. These three areas are defined repeatedly in the track direction. In the writing operation, an ID area in which a cylinder address is pre-recorded is read and then a data area is written. If the center of the write core is aligned with the center of a track, the ID area is offset and read. A read margin is therefore reduced, and an error is likely to occur.

To avoid this, the ID area must be offset relative to the data area during formatting. Then writing can be performed. However, if the center of the read core is aligned with the data area during reading, since the ID area is read with it offset, the read margin is reduced, and an ID-area read error is likely to occur. When the center of the read core is aligned with the ID area, the write core in turn is off-track, which causes the read margin of the data area to diminish.

An ID-less format can be made by eliminating the ID area from the track format, as in Japanese Unexamined Patent Publication No. 5-174498. In a disk unit adopting the ID-less format, instead of eliminating the ID area, ID information such as a cylinder number, head number, or the like is recorded in the form of, for example, gray codes in a servo area. Thus, even if an off-track occurs, ID information reading can be achieved reliably, and head positioning for writing is guaranteed.

Using this ID-less format, it becomes unnecessary to align the center of the read core on a track with the center of the ID area and then perform reading. Writing and reading relative to the data area can be performed by aligning the centers of the write core and read core with the center of a track. However, in a conventional disk unit adopting the ID-less format, the recording density in the servo area is generally kept low in order to avoid a read error derived from an off-track. If track ID information such as a cylinder number, head number, or the like is placed in the form of gray codes or the like in-the servo area, a ratio of the area on the disk occupied by servo frames increases, and formatting efficiency falls.

In an effort to solve this problem, a method has been conceived in which track ID information or a logic block address (LBA) of data is placed in the data area that has undergone track formatting instead of placement of ID information in the servo area. Then the data area can be checked using a hard disk controller (HDC). However, although such a method can check the data during reading, it does not include a procedure of checking the data during writing, so there is a possibility that data may be written on an incorrect track.

SUMMARY OF THE INVENTION

The present invention has been devised in consideration of the foregoing problems, and provides a high density disk unit and disk media in which track ID information is not placed in a servo area, or if it is placed there, a necessary minimum is placed.

The disk unit includes a disk medium having at least one data side which is divided into a plurality of information areas, arranged in succession in a track direction. Each information area has a servo area and a data area. A track ID area in which track information is recorded is defined at the start position of the data area immediately following each servo area. A servo demodulation circuit is provided for demodulating head position information from a read signal recorded in the servo area, and a write data modulation circuit modulates write data and writes it in the data area.

A formatter circuit allows the write data modulation circuit to write track information in the track ID area during track formatting, and allows the read data demodulation circuit to read. data from the track ID area and to detect track information during writing or reading.

BRIEF DESCRIPTION OF THE DRAWINGS

These and other features of the invention and the manner of obtaining them will become more apparent, and the invention itself will be best understood by reference to the following description of the indention taken in conjunction with the accompanying drawings, in which:

FIG. 4 is a IV—IV sectional view of FIG. 3;

FIG. 5 is an explanatory diagram of a data side of a magnetic disk shown in the device of FIG. 2;

FIG. 6 is an explanatory diagram of a track format of the present invention for a two-phase servo;

FIGS. 7(A)–7(E) are explanatory diagrams of a track format of the present invention in which part of a cylinder address is left in a servo frame;

FIGS. 8(A)–8(D) are explanatory diagrams of a track format of the present invention for a phase servo;

FIG. 9 is a block diagram of a write data modulation circuit included in a read/write LSI shown in FIG. 2;

FIG. 19 is an explanatory diagram on another embodiment of track formatting of the present invention; and FIG. 20 is an explanatory diagram on another embodiment of track formatting of the present invention.

DETAILED DESCRIPTION

Figure 1:
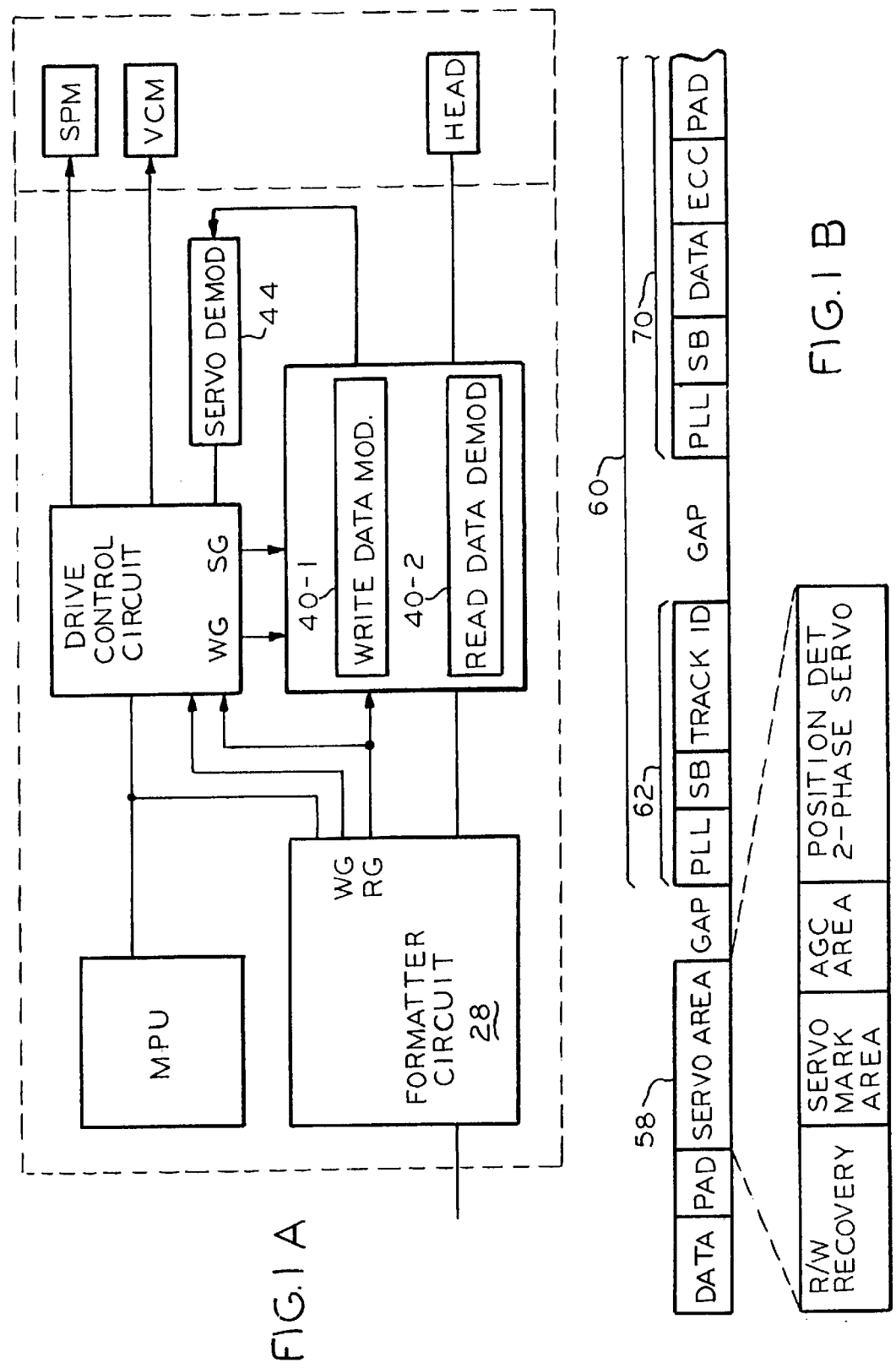
FIGS. 1(A) and 1(B) are explanatory diagrams on the principles of the present invention.

FIGS. 1(A) and 1(B) are explanatory diagrams of the principles of the present invention. As shown in FIG. 1(B), a track on a disk medium employed in this embodiment has a data side divided in a track direction into a servo area (servo frame) 58 and data area 60. A track ID area 62 is recorded in which track information is defined at the start position of the data area 60 immediately following the servo area 58. As shown in FIG. 1(A), a servo demodulation circuit 44 is provided for demodulating head position information from a read signal of the servo area 58. A write data modulation circuit 40-1 modulates and writes write data in the data area 60, and a read data demodulation circuit 40-2 demodulates read data from a read signal of the data area 60.

A formatter circuit 28 allows the write data modulation circuit 40-1 to write track information in the track ID area 62 during track formatting. The formatter circuit 28 allows the read data demodulation circuit 40-2 to read the track ID area 62 during writing of the data area 60 (if necessary, also during reading) and to detect track information.

A disk unit of the present invention can record or reproduce data at a high density in or from the data area 60 using the write data modulation circuit 40-1 and read data demodulation circuit 40-2, which have the functions of partial response maximum likelihood detection (PRML), 8/9 conversion, and the like. Consequently, if the track ID information 62 is read or written using the same write data modulation circuit 40-1 and read data demodulation circuit 40-2 used for data, a recording area for the track ID information 62 can be minimized and formatting efficiency can be improved drastically.

In this case, it is difficult to switch the servo demodulation circuit 44 and the write data modulation circuit 40-1, or the read data demodulation circuit 40-2, within the servo area 58. The track ID area 62 is recorded in the same recording form as that in which information is recorded in the data area 60. The track ID area 62 is therefore defined sequentially with respect to the servo area 58. For writing, therefore, writing at a correct cylinder position can be guaranteed by reading the track ID area 62 at the start of the data area 60. If necessary, reading at a correct cylinder position can be checked by reading the track ID information at the start of the data area.

In the case of servo demodulation in which a peak level of a read signal is detected in order to locate a head position, the servo area 58 is composed of a recovery area used to switch reading and writing, a servo mark area in which a servo mark indicating a servo area is recorded, an AGC area in which an AGC pattern used for AGC control of a read signal is recorded, and a position detection area in which a two-phase servo pattern used to detect a head position is recorded.

The track ID area 62 at the start of the data area 60 is composed of a PLL synchronization control area used to synchronize. the oscillatory frequency of a read clock with the rotation of a disk. A sync byte area SB in which a synchronization pattern used to synchronize read data with the read clock is recorded, and an ID recording area in which track information such as a cylinder address or the like is recorded.

In the case of servo demodulation based on peak detection, a track ID area in which partial track information is recorded may be included in the servo area 58, and the remaining track ID information may be recorded in the ID track recording area within the track ID area 62. To be more specific, in the case of a two-phase servo pattern, since the same pattern is repeatedly recorded in units of four tracks, gray codes representing two low-order bits of a cylinder address are recorded in the track ID area within the servo area 58 (shown as gray code 88 in FIG. 19). In the ID recording area within the data area 60, the remaining high-order bit data of the cylinder address is recorded. The track ID area within the servo area can therefore be shortened by the two low-order bits of the cylinder address.

By contrast, in the case of servo demodulation based on a phase servo in which a phase servo pattern is recorded and a head position is detected on the basis of a read signal, the servo area 58 includes a training area in which a synchronization pattern is used to synchronize a reference clock oscillator in phase with a read signal. The servo area 58 also includes a marker area in which a marker indicating a specific position within the servo area is recorded, and a position detection area in which a phase servo pattern is recorded. These areas within a servo area are seen in serve area 90 in FIG. 20. In this case, the track ID area 62 is composed of a PLL oscillation control area, a sync byte area SB, and an ID recording area in the same manner as it is in the peak detection servo demodulation.

Recording track information using the formatter circuit 28 is such that a write head is off-tracked toward a read head with respect to the center of a track by or distance between the centers of the read head and write head, which are mounted unitedly in a head unit, and then ID information is written. The write head is thus offset to a position at which the center of the read head lies when the write head is aligned with the center of a track. In order to write track ID information, the center of the read head is located at the recording center position of the track ID area 62 immediately following the servo area 58 during writing.

A read error will therefore not occur but track information can be detected reliably, whereby a writing operation can be assured. Moreover, for reading, it is unnecessary to read track information. Byte counting alone is needed. Off-tracking recording will therefore pose no problem.

For measuring the magnitude of an off-track between the write head and read head using the formatter circuit 28, when tracks are formatted sequentially, the head is positioned at a track to be formatted, and the magnitude of a mismatch or distance between the read head and write head, which are mounted unitedly in the head unit, is measured. The write head is off-tracked toward the read head by the measured magnitude of any mismatch or distance between the read head and write head. In this state, track ID information is written in the track ID area 62.

For practically measuring the magnitude of a mismatch using the formatter circuit 28, first, the write head is used to write measurement data (solitary wave) on a track. Thereafter, the write head is changed into the read head. An off-track is varied in units of a very small magnitude, and off-tracking is repeated until a peak value of a read signal is obtained. The magnitude of an off-track at that time is measured as the magnitude of a mismatch.

The present invention also provides a disk medium itself. The disk medium has at least one data side which is divided in a track direction into a plurality of pairs of the servo area 58 and data area 60. The track ID area 62 in which track information is recorded is defined at the start position of the data area 60 immediately following the servo area 58. The contents of the servo area and track ID area on the disk medium are identical to those described in conjunction with the disk unit.

Figure 2:
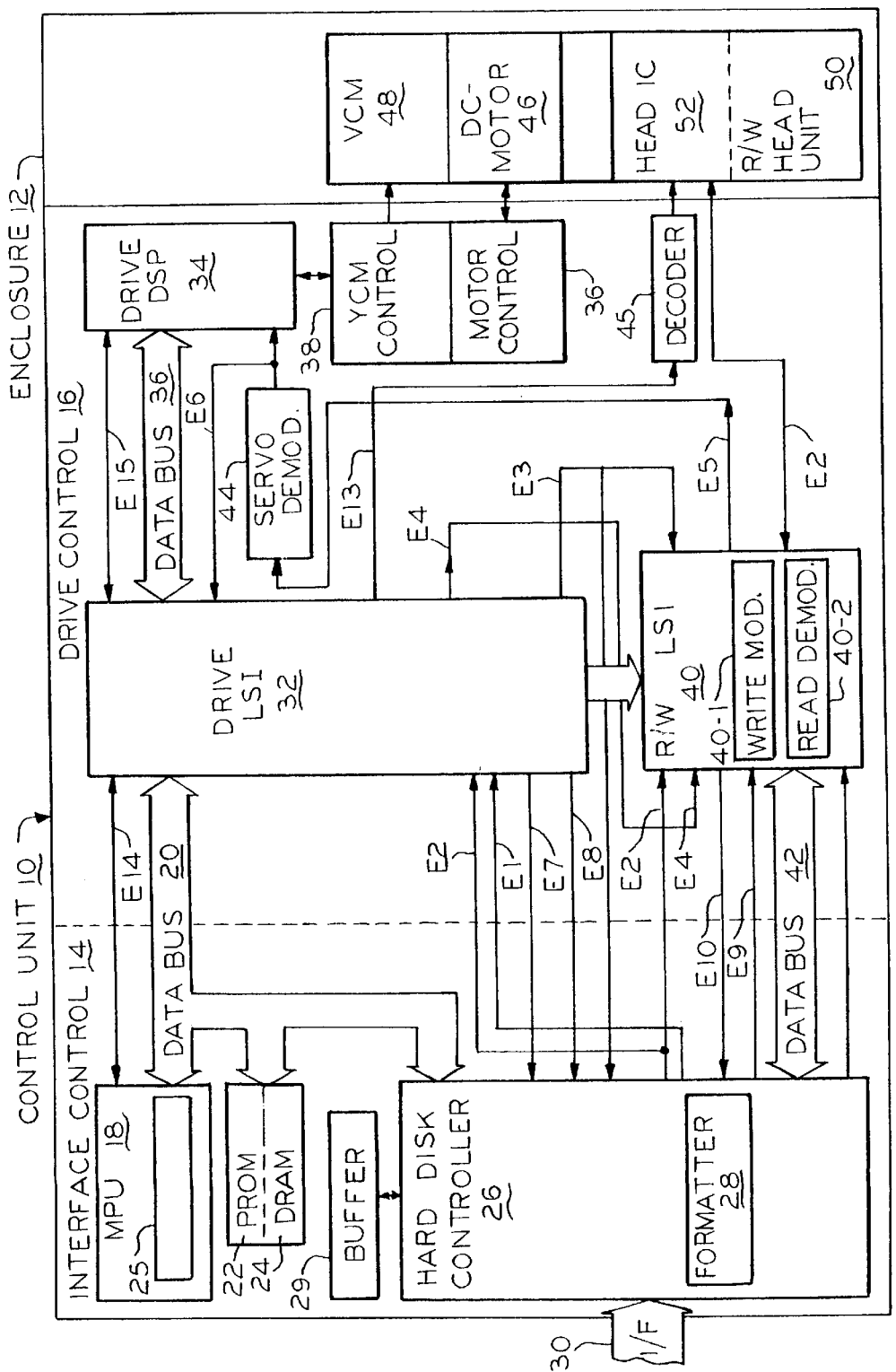
FIG. 2 is a block diagram of an embodiment of the present invention.

FIG. 2 is a block diagram showing the overall configuration of a disk unit of the present invention. A disk unit includes a control unit 10 and an enclosure 12. The control unit 10 is divided into an interface control unit 14 and a drive control unit 16.

The interface control unit 14 includes an MPU 18 responsible for overall control, a PROM 22 for storing control programs and various parameters, a DRAM 24 used as a work memory for developing any of the programs stored in the PROM and executing control, a hard disk controller (HDC) 26 connected to an upper-level disk controller via an interface 30, and a buffer memory 29 for temporarily storing transfer data. The hard disk controller 26 has the capability of the formatter circuit 28.

The drive control unit 16 includes a drive LSI 32, a drive DSP 34, a VCM control circuit 38, a motor control circuit 36, a read/write LSI 40, a servo demodulation circuit 44, and a decoder 45. A write data modulation circuit 40-1 and read data demodulation circuit 40-2 are incorporated in the read/write LSI 40. A recording/reproducing system adopted for a disk medium by the write data modulation circuit 40-1 and read data demodulation circuit 40-2 is adapted for high-density recording/reproducing based on partial response maximum likelihood and 8/9 conversion.

The enclosure 12 includes a DC motor 46 serving as a spindle motor for rotating a disk medium, and a voice coil motor 48 (hereinafter a VCM) for driving a head actuator for head positioning. Moreover, a head unit 50 composed of a plurality of composite heads working on a disk medium, and a head IC 52 for switching the heads and processing signals used for head writing and reading are included.

Figure 3:
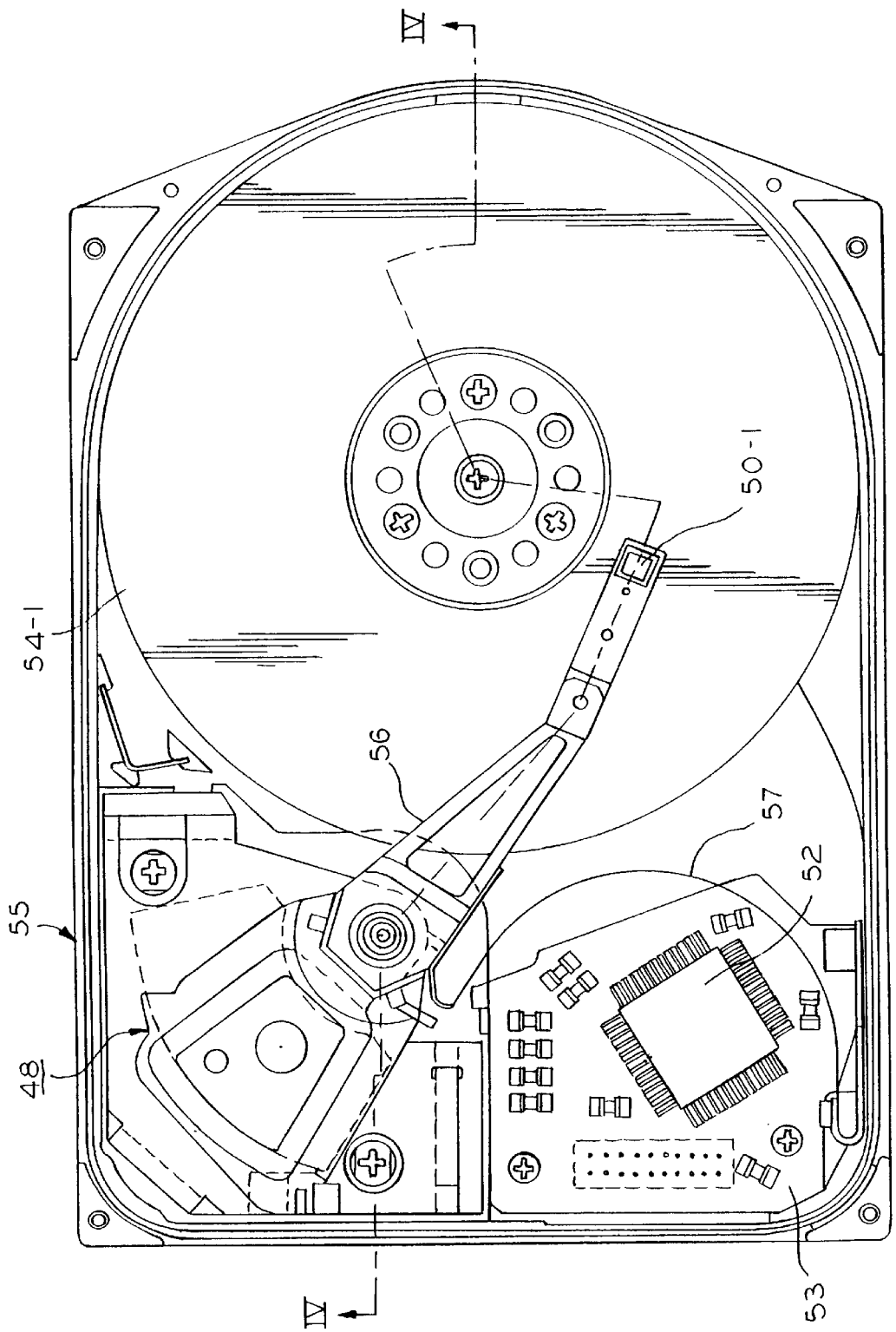
FIG. 3 is a sectional view of the internal structure of the device shown in FIG. 1.

FIG. 3 shows the internal structure of the enclosure 12 shown in FIG. 2. A magnetic disk 54-1 is placed in a cover 55 of the disk unit so that the disk unit can be rotated freely by the DC motor 46. As shown in FIG. 4 (an IV—IV section of FIG. 3), the magnetic disk includes three magnetic disks 54-1 to 54-3.

A rotary head actuator 56 to be rotated by the VCM 48 is located at a corner in the cover 55. A composite head 50-1 is attached to the tip of the head actuator 56. The number of composite heads is six because both sides of each of the three magnetic disks 54-1 to 54-3 serve as a data side. Six composite heads 50-1 to 50-6 are therefore attached to the head actuator 56. The head IC 52 is mounted on an FPC 53, located in the vicinity of the head actuator 56, and is connected to the head actuator 56 via an FPC band 57.

Each of the composite heads 50-1 to 50-6 uses an inductive head as a write head and an MR head as a read head. Both the write head and read head are integrated into the head unit.

FIG. 5 shows a formatted state of a data side of the magnetic disk 54-1 shown in FIG. 3. To begin with, the data side is divided into three zones, for example, zones Z0, Z1, and Z2 in a radial direction. For each zone, an inherent recording frequency is used for constant-density recording.

Relative to the zones Z1 to Z3 divided in the radial direction, servo frames 58-1, 58-2, 58-3, 58-4, 58-5, etc. are defined at intervals of a constant angle in a circumferential direction. As for an area in any of the zones Z0 to Z2 between each pair of the servo frames 58-1 to 58-5, for example, an area in the zone Z2 between the servo frames 58-1 and 58-2 is divided into sector areas 60-1 and 60-2.

FIG. 6 shows part of one track record on the data side shown in FIG. 5 along a straight line. One sector is divided into a servo frame 58 and a data area 60. The servo frame 58 includes a read/write recovery area 80, a servo mark area 82, an AGC area 84, and a position detection area 86. The read/write recovery area 80 is a transition area used to make a transition from a data writing operation into a reading operation for the servo frame 58.

In the servo mark area 82, a given code indicating that the servo frame 58 starts is recorded. The AGC area 84 is an area in which an AGC pattern used to control the gain of an AGC circuit is recorded, for giving control so as to stabilize the reading amplitude of a read signal of the servo frame 58. In the position detection area 86 in this embodiment, a two-phase servo pattern is recorded, which is used to demodulate a head position signal (position error signal) on the basis of peak detection of a position detection signal. This is known as a two-phase servo.

In the servo frame 58, track ID information such as a cylinder address used to identify a writing track during a writing operation is not placed. The track ID information is recorded in a track ID area 62 defined immediately after the servo frame 58 with a gap 59 between them. The track ID area 62 is composed of a PLL synchronization area 64, a sync byte area 65, and an ID recording area 66.

In the PLL synchronization area 64, a pattern is recorded to synchronize a voltage control oscillator VCO in a PLL circuit included in the read data demodulation circuit 40-2 in the read/write LSI shown in FIG. 2 with the rotation of a disk. In the sync byte area 65(SB), a sync byte pattern used to synchronize read data with a read clock produced by the read data demodulation circuit 40-2 is recorded.

In the ID recording area 66, at least a cylinder address CC is recorded. Unlike the recorded information in the servo frame 58, each record data in the track ID area 62 is recorded in the same form as normal write data by means of the write data modulation circuit 40-1 included in the read/write LSI 40 shown in FIG. 2.

The track ID area 62 is followed by a data area 70 via a gap 68. The data area 70 is composed of a PLL synchronization area 72, a sync byte area (SB) 73, a data area 74, an ECC area 76, and a pad area 78. In the PLL synchronization area 72, the same synchronization pattern as that in the PLL synchronization area 64 within the track ID area 62 is recorded.

In the sync byte area 73, the same sync byte pattern is recorded as that in the sync byte area 65 within the track ID area 62. In the data area 74, appropriate user data is written. In the ECC area 76, an ECC code for error detection and correction which is produced by an ECC encoder on the basis of user data in the data area 74 is written. As for the pad area 78, since the disk unit of the present invention adopts an on-the-fly method in which encoding and decoding of an EQC code are performed simultaneously while user data is being transferred, an empty area dependent on an encoding loss or decoding loss deriving from the on-the-fly operation is set.

FIG. 7 is a timing chart for a writing operation performed in the disk unit of the present invention having the track record shown in FIG. 6. A description will be made below with reference to FIG. 2.

First, a seek command based on a read access is issued from an upper-level disk controller via the interface 30, received by the hard disk controller 26, and then sent to the MPU 18. The seek command is then interpreted.

By interpreting the seek command, a head number HH and cylinder address CC which are regarded as access addresses are obtained. The access addresses are reported to the drive LSI 32. The drive LSI 32 supplies the head address HH as a head address signal E13 to the decoder 45. Based on the head address HH, the head IC 52 changes a composite head into a corresponding composite head of the head unit 50.

At the same time, the cylinder address CC is reported from the drive LSI 32 to the drive DSP 34. The drive DSP 34 starts seek control with a target cylinder address CC regarded as a target cylinder. The seek control is based on speed control performed by the VCM control circuit 38.

When seek control is under way, read serial data E12 provided by the corresponding head of the head unit 50 is supplied as a servo separation signal E5 to the servo demodulation circuit 44 via the read/write LSI. A head position detection signal contained in servo data E6 demodulated by the servo demodulation circuit 44 is fetched at intervals of a given sampling cycle by the drive DSP 34. A head position is thus detected.

When the head reaches the target cylinder, the seek control is changed into on-track control. When the seek control is thus completed, seek completion report is made to the MPU 18 via the drive LSI 32. The MPU 18 instructs the hard disk controller 26 to initiate a writing operation.

At this time, taking the track record in FIG. 7A for instance, the drive LSI 32 outputs a servo gate signal E3 that goes high according to the timing of time instants t1 and t2, respectively, a length between which coincides with the servo frame 58, to the read/write LSI 40. While the servo gate signal E3 remains high, the read serial data E12 sent from the head unit 50 is fed as a servo separation signal E5 to the servo demodulation circuit 44.

The servo demodulation circuit 44 demodulates servo data E6 from the servo separation signal E5. In other words, read information read from the read/write recovery area 80, servo mark area 82, AGC area 84, and position detection area 86 constituting the servo frame 58 shown in FIG. 6 is demodulated and supplied to the drive LSI 32.

Since one specific servo mark area 82 in a track record contains an index pattern, the drive LSI 32 outputs an index pulse E8 to the hard disk controller 26 according to the timing of the specific servo mark, area. Moreover, a sector pulse E7 shown in FIG. 7(B) is generated according to the timing of a time instant t2 at which the servo frame 58 ends and of a time instant t3 at which the track ID area 62 starts.

The formatter circuit 28 in the hard disk controller 26, having received the sector pulse E7, drives a write gate signal E1 high according to the timing of a time instant t3 at which the sector pulse E7 ceases. The drive LSI 32 detects the timing of a time instant t4, at which reading the next data area 72 is started, in terms of the time instant t3 at which reading the track ID area 62 following the servo frame 58 is carried out, and drives a write gate signal E4 shown in FIG. 7(E) high at the time instant t4.

A period from the time instant t3 at which the write gate signal E1 shown in FIG. 7(D) goes high to the time instant t4 at which the write gate signal E4 shown in FIG. 7(E) goes high is a reading period for reading the track ID area 62 included in a track record. The read serial data E12 provided by reading the track ID area 62 is demodulated into NRZ data by the read data demodulation circuit 40-2 in the read LSI 40 during the period from the time instant t3 to t4.

In other words, demodulated data of the PLL synchronization area 62 within the track ID area 62 shown in FIG. 6 is subjected to synchronization control by the PLL voltage control oscillator VCO included in the read data demodulation circuit 40-2. As for the succeeding sync byte area 65, read data of a sync pattern and a read clock generated by a PLL, having been through with synchronization control, are subjected to synchronization control.

Demodulated NRZ data concerning the last ID recording area 66 is transferred to the formatter circuit 28 over a data bus 42, and set in a track ID storage register. In the formatter circuit 28, an expected value of a cylinder address at which a writing operation is under way is pre-set.

The cylinder address read from the track ID area 62 and transferred from the read data demodulation circuit 40-2 is compared with the value set in the register for storing a cylinder address. If the cylinder address agrees with the expected value, it is confirmed that the writing operation is performed on a correct target cylinder. According to the timing of the time instant t4 shown in FIG. 7, the write gate signal E4 (shown in FIG. 7(E)) sent from the drive LSI 32 is driven high. Data writing for the data area 70 is then performed by the write data modulation circuit 40-1.

By contrast, if the cylinder address read from the track ID area 62 by the formatter circuit 28 disagrees with the expected value, a difference from a correct cylinder address is recognized on the basis of a difference of the read cylinder address from the expected value. A seek error is then reported to the MPU 18. At the same time, a cylinder difference from the target cylinder is reported in order to retry a seek operation to be performed by the drive LSI 32 and drive DSP 34.

FIG. 8 is a timing chart on a reading operation for the track record shown in FIG. 6. During a reading operation, the track ID area 62 immediately succeeding the servo frame 58 shown in FIG. 6 is ignored. Normal demodulation is performed on the data area 70.

To be more specific, when reading is performed on a track record shown in FIG. 8(A), a sector pulse E7 shown in FIG. 8(B) and a servo gate signal E3 shown in FIG. 8(C) are identical to those in FIG. 7, as produced during a writing operation. According to the timing of a time instant t13 at which the sector pulse E7 ceases, as shown in FIG. 8(D), a read gate signal E2 to be fed from the hard disk controller 26 to the drive LSI 32 and read/write LSI 40 is driven high in order to initiate a reading operation.

In a read state in which the read gate signal E2 is high, a predetermined number of bytes comparable to a track ID area within the track area 62 is counted in order to identify the start position of the data area 70. NRZ data demodulated from the start position of the data area 70 is transferred to the hard disk controller 26 and stored in the buffer memory 29.

FIG. 9 is a block diagram of the write data modulation circuit 40-1 included in the read/write LSI 40 shown in FIG. 2. The write data modulation circuit 40-1 adopts, for example, a partial response class-4 maximum likelihood method (PR4ML). As for the enclosure, a state in which a specific write head 110 is selected and connected on a fixed basis is shown for a simpler description. As for the write head 110 in a composite head of the present invention, an inductive head is used.

During a writing operation, NRZ data is input as write data. The NRZ data is scrambled in a quasi-random fashion by an 8/9 encoder and scrambler circuit 110, and then converted into an 8/9 run-length code. The data converted into an 8/9 run-length code is converted into data having a transfer characteristic 1/(1+D) conformable to a magnetic disk transfer system by a pre-coder circuit 102.

An output of the pre-coder circuit 102 is subjected to regulation intended to compensate for a write current by a write compensator circuit 104. A write flip-flop circuit 106 performs a flip-flop operation according to a data stream, and drives a write driver circuit 108. The write head 110 then performs magnetic recording on the data side of a disk.

Figure 10:
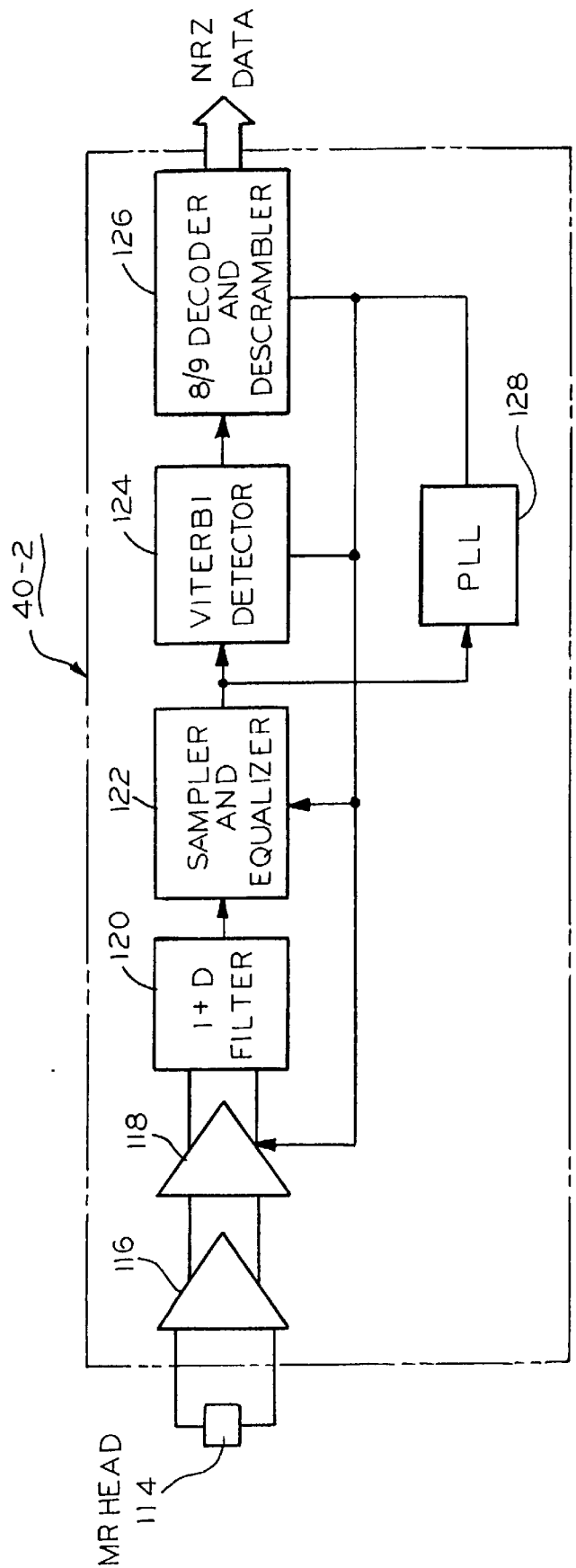
FIG. 10 is a block diagram of a read data demodulation circuit included in the read/write LSI shown in FIG. 2.

FIG. 10 is a block diagram of the read data modulation circuit 40-2 included in the read/write LSI 40 shown in FIG. 2. Herein, as for the enclosure, a specific composite head is selected, and an MR read 114 that is a read head of the composite head is connected on a fixed basis.

In a reading operation, a given sense current is supplied to the MR head 114. A read signal based on the sense current and recording magnetism stemming from a track record is output. The read data demodulation circuit 40-2, which is comparable to the write data modulation circuit 40-1 shown in FIG. 9, demodulates NRZ data through waveform equalization based on PR4ML or the like. The read signal sent from the MR head 114 is amplified by a fixed amplifier 116 and AGC amplifier 118, and is then subjected to analog filtering, which precedes PR4 equalization, by a (1+D) filter 120.

The (1+D) filter 120 is followed by a sampler and equalizer circuit 122. An analog output signal of the (1+D) filter 120 is sampled at intervals of a cycle matching with a recording frequency, and converted into digital data. Waveform data sampled is subjected to waveform equalization through PR4 equalization.

A data stream subjected to PR4 equalization by the sampler and equalizer circuit 122 is fed to a Viterbi detection circuit 124. The most likely data stream is detected according to a maximum likelihood algorithm. A data stream detected by the Viterbi detection circuit 124 is subjected to 8/9 run-length inverse conversion and descrambling that is intended to restore an original data stream by an 8/9 decoder and descrambler circuit 126, and then output as NRZ data, which is final real data.

A PLL circuit 128 performs a PLL operation synchronous with a pulse train that is an equalized output of the sampler and equalizer circuit 122 so as to produce a clock signal. The PLL circuit thus synchronizes the AGC amplifier 118, sampler and equalizer circuit 122, Viterbi detection circuit 124, and 8/9 decoder and descrambler circuit 126 with the clock.

FIGS. 9 and 10 take PR4ML-based recording and reproducing, for instance. Needless to say, recording and reproducing based on any other method such as EPR4ML or the like will do.

Next, formatting of the track record shown in FIG. 6 will be described. Track formatting for a disk medium is carried out in response to a track formatting command sent from an upper-level disk controller connected externally after writing of the servo frame 58 by a servo writer. This process can be completed at the factory prior to delivery of the disk unit of the present invention. Needless to say, instead of being performed at the factory prior to delivery, track formatting may also be performed in response to a track formatting command issued from an upper-level disk controller when the disk unit is started up by turning on the power supply.

Figure 11:
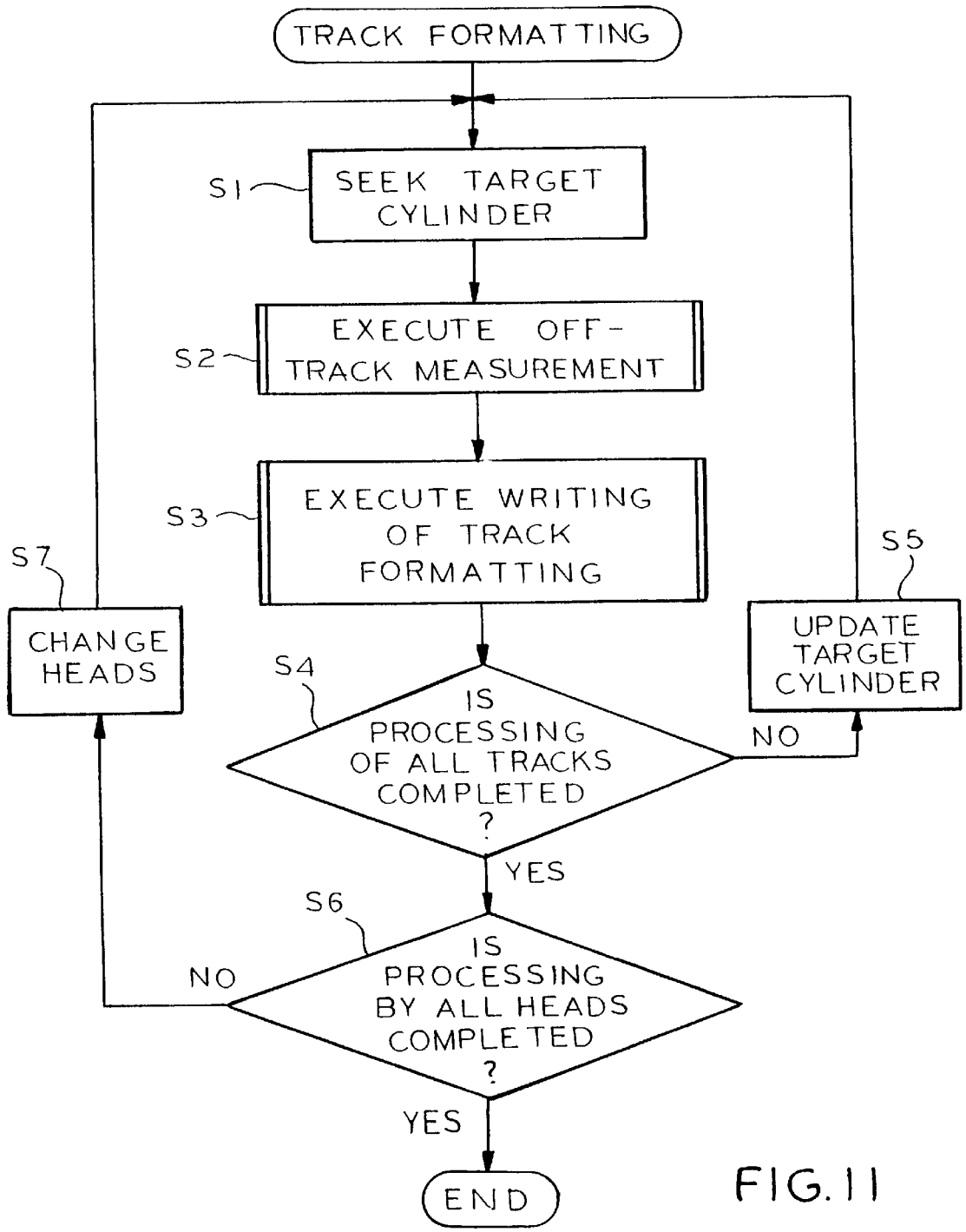
FIG. 11 is a flowchart on formatting of a track ID area in accordance with the present invention.

FIG. 11 is an overall flowchart describing track formatting in the disk unit of the present invention. The track formatting is achieved using the formatter circuit 28 in the hard disk controller 26 under the control of the MPU 18 shown in FIG. 2.

First, at step S1, the MPU 18 executes seek control so as to place a head on a first target cylinder on which track formatting is started. When the seek control for the target cylinder is completed, off-track measurement is executed at step S2 in order to measure the magnitude of an off-track between a write head and read MR head of a composite head associated with a data side to be subjected to track formatting first.

The off-track measurement is performed by an off-track measurement unit 25 realized by a program controlled by the MPU 18 shown in FIG. 2. When the off-track measurement is completed at step S2, writing of track formatting is executed at step S3. In the writing of track formatting, as shown in FIG. 6, writing the track ID area 62 add data area 70 is performed on sector areas between each pair of the servo frames 58. As for the track ID area 62, the write head is off-tracked toward the read head by the magnitude of an offtrack of the read head relative to the write head which is measured at step S2. Writing the track ID area 62 is then performed.

Owing to the writing of the track ID area 62 through off-tracking, even if on-track control is performed to align the center of the write head with the center of a track during a writing operation, the MR head off-tracked relative to the write head can be aligned with the center of the track ID area 62. A reading operation for the track ID area 62 by the MR head is thus guaranteed for the writing operation.

When writing of track formatting is completed at step S3, it is checked at step S4 whether or not all tracks on the data side have been handled. If all tracks have not been handled, position track seek is performed in order to update an adjoining cylinder as a target cylinder at step S5. Writing of track formatting of step S3 is repeated again.

If it is judged at step S4 that processing of all tracks is completed, control is passed to step S6. It is checked whether or not processing by all heads is completed. If processing is not completed, heads are changed at step S7. Control is returned to step S1, and the same processing is repeated again. If processing by all heads is completed, a sequence of track formatting is terminated.

Figure 12:
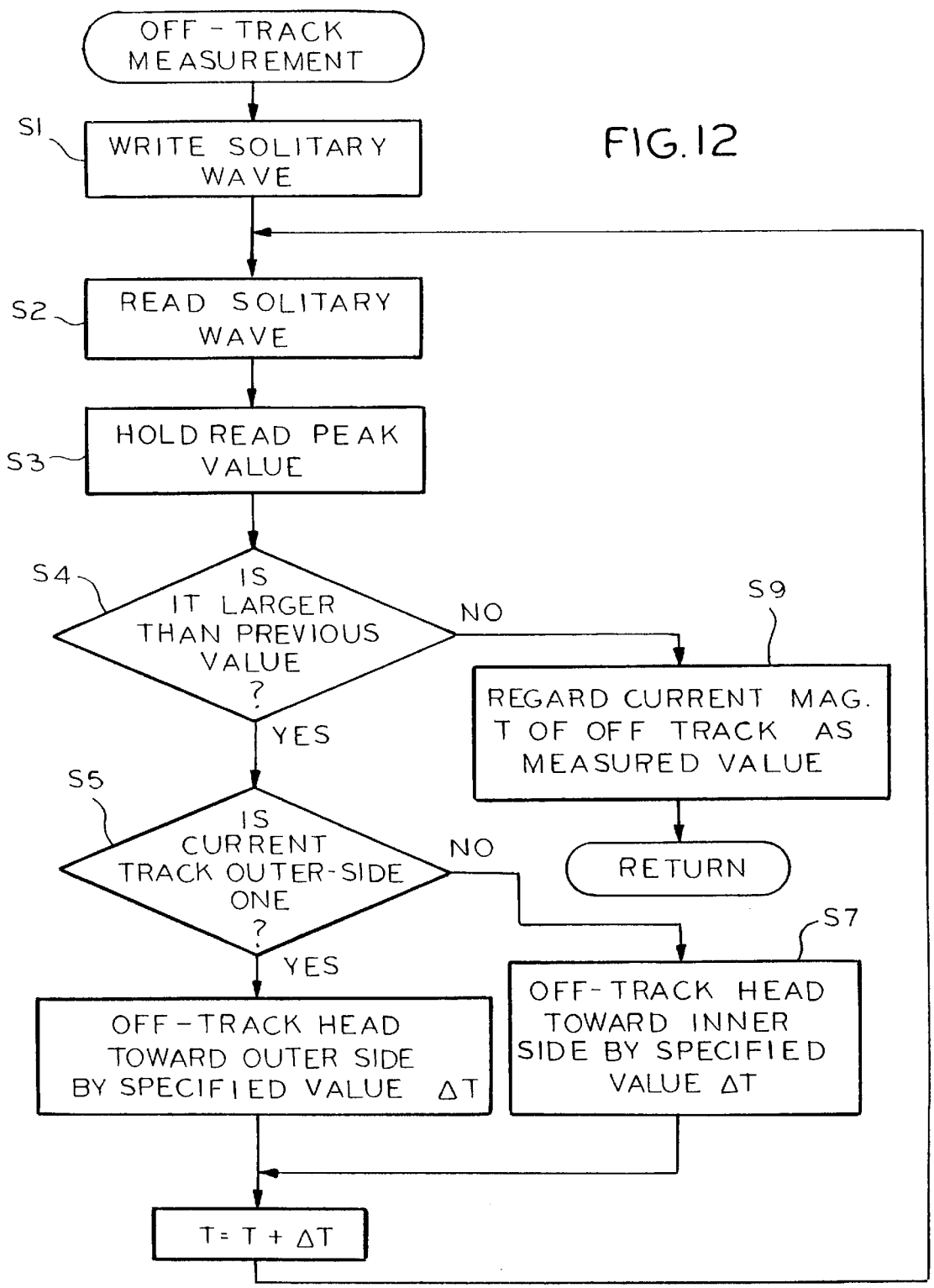
FIG. 12 is a flowchart on off-track measurement performed during formatting in FIG. 11.

FIG. 12 is a flowchart describing off-track measurement of step S2 within track formatting described in FIG. 11. In off-track measurement, first, a target cylinder for which writing of off-tracking is executed is on-tracked, and a solitary wave is written in data divisions on the cylinder.

Next, at step S2, the written solitary wave is read, and a read peak value is held. At step S4, it is checked whether or not the current read peak value is larger than a previous read peak value. Since an initial read peak value is larger than the previous read peak value, control is passed to step S5. It is then checked if a current track is an outer-side one or an inner-side one.

If the current track is an outer-side one, control is passed to step S6. Off-tracking is performed in order to offset a head toward the outer side of a disk by a predetermined very small specified magnitude $\Delta T$, for example, $\Delta T=0.1$ track. At step S8, the magnitude T of an off-track is incremented by $\Delta T$. By contrast, if it is found at step S5 that the current track is an inner-side one, control is passed to step S7. The head is off-tracked toward the inner side of a disk by the same specified magnitude of $\Delta T=0.1$ track. At step S8, the magnitude T of an off-track, is incremented by $\Delta T$.

FIG. 13 (A) shows offset states of a write core 132 of a write head, which is an inductive head, and a read core 134 of a read head, which is an MR head, relative to a track which are established when the composite head 50-1 is on-tracked on an outer-side cylinder by the rotary head actuator 56 shown in FIG. 3.

When a head is positioned on the outer side of a disk, the center line 136 of the head actuator becomes, as illustrated, oblique with respect to a track direction. The center line 144 of the read core 134 is mismatched with the center line 142 of the write core 132 by the magnitude of an off-track 138 toward the inner side of a disk. If the track ID area 62 shown in FIG. 6 is written on the center line 142 of the write core 132 as it is, reading by the read core 134 located at a position displaced by the magnitude of an off-track 138 cannot provide a read signal of a sufficient level. There is a possibility of occurrence of a read error.

In the present invention, therefore, when the track ID area 62 is to be written, the write core 132 is offset toward the inner, side by the magnitude of an off-track 138 so that the center line of the write core 132 will be aligned with the center line 144 of the read core 134. The track ID area 62 is then written. Prior to a writing operation of track formatting, off-track measurement described in FIG. 12 is executed in order to measure the magnitude of an offset 138 between the center line 142 of the write core 132 and the center line 144 of the read core 134.

Figure 13A:
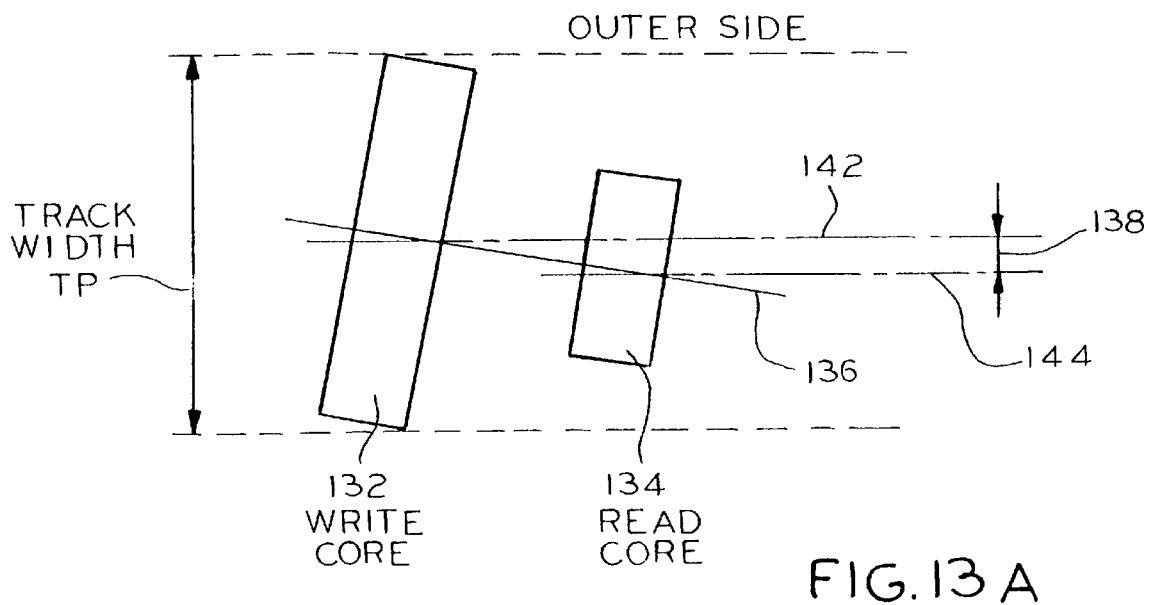
FIGS. 13(A) and 13(B) are explanatory diagrams on an off-track between a read core and write core on inner and outer sides.

Specifically, as described in the flowchart of FIG. 12, for the outer side of a disk shown in FIG. 13(A), a solitary wave is written on the center line 142 of the write core 132 by the write core 132 at step S2, and then the solitary wave is read by the read core 134 with the magnitude of an off-track 138 left intact. A peak value is then held. Thereafter, for the outer side, the head is shifted toward the outer side by, for example, $\Delta T=0.1$ track in order to correct the off-track. The solitary wave is read again by the read core 134, and a read peak value is held.

As the read core 134 is moved by bits toward the outer side, the level of a read signal of the solitary wave recorded on the center line 142 by the write core 132 rises gradually. When a maximum value is obtained, the center of the read core 134 is aligned with the center line 142 of the write core 132 on which the solitary wave is written. Consequently, when a read peak value obtained by shifting the read core in units of $\Delta T$ 0.1 track at step S14 in FIG. 12 becomes smaller than a previous value, control is passed to step S9. The magnitude T of an off-track measured at the current step S8 is regarded as a measured value.

Figure 13B:
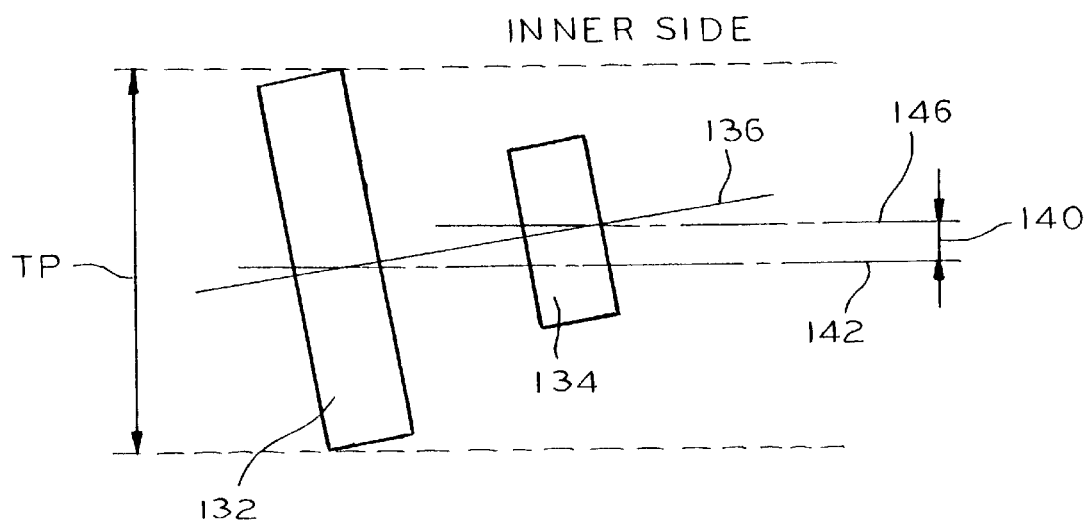

FIG. 13(B) shows a case in which the head is on-tracked toward the inner side of a disk. In this case, a magnitude 140 of an off-track that is inverse to the one occurring when the head is on-tracked toward the outer side as shown in FIG. 13(A) occurs. The same measurement as that of step S7 in FIG. 12 is executed while the head is being shifted toward the inner side in units of the specified magnitude $\Delta T=0.1$ track. If it is found at step S4 that the magnitude of an off-track is smaller than the previous one, control is passed to step S9. The magnitude T of an off-track obtained at step S8 is regarded as a measured value.

Off-track measurement described in FIG. 12 is an example. Any appropriate measurement of a magnitude of an off-track between a write core and a read core will do.

Figure 14:
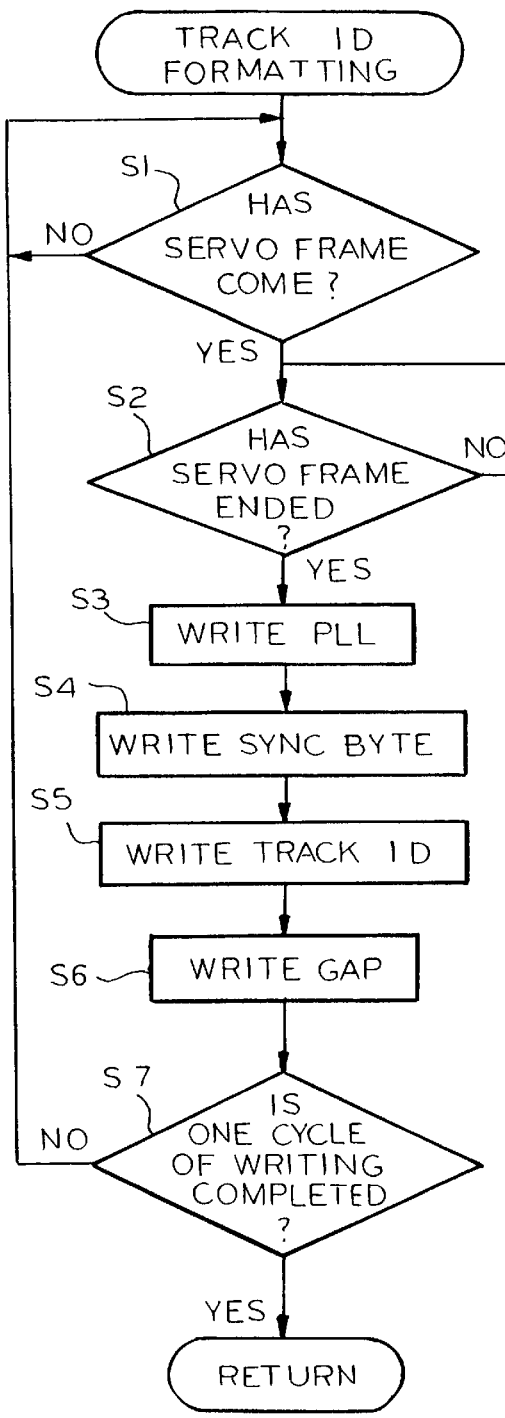
FIG. 14 is a flowchart for writing the track ID formatting of FIG. 11.

FIG. 14 is a flowchart describing writing of track formatting of step S3 in FIG. 11. A description will be made of formatting of a track ID area described in FIG. 14 below with reference to FIG. 6. First, at step S1, it is checked whether or not a servo frame 58 has come. If a servo frame 58 has come, it is checked at step S2 whether or not the servo frame has ended.

If the servo frame 58 has ended, the gap 59 is identified through clock counting. Thereafter, a PLL synchronization pattern for the track ID area 62 is written at step S3, and a sync byte pattern is written at step S4. A track ID is written at step S5, and the gap 68 is written at step S6.

At step S7, it is checked whether or not one cycle of writing is completed. If it is not completed, control is returned to step S1. The same processing is repeated from the servo frame in the next sector. If one cycle of writing is completed, processing for the track is terminated. Control is returned to the main routine described in FIG. 11.

Next, a writing operation and reading operation by the formatter circuit 28 included in the hard disk controller 26 of the embodiment shown in FIG. 2 will be described.

Figure 15:
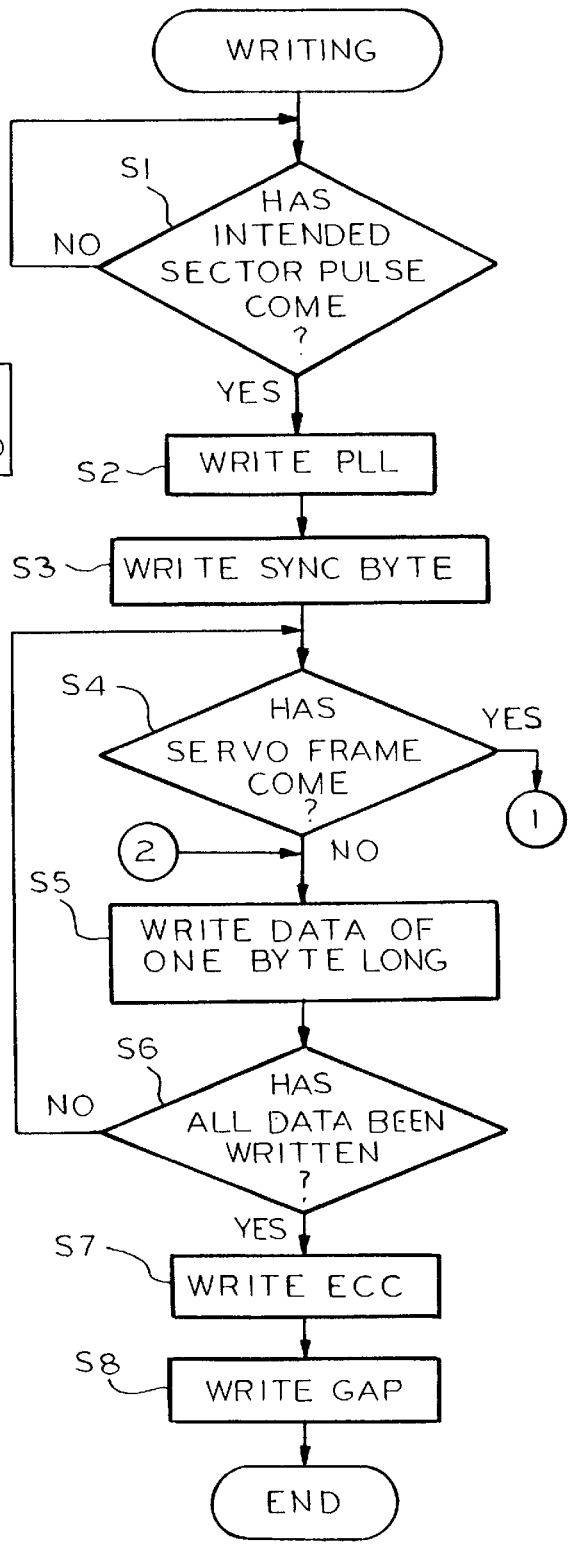
FIG. 15 is a flowchart on writing in accordance with the present invention.
Figure 16:
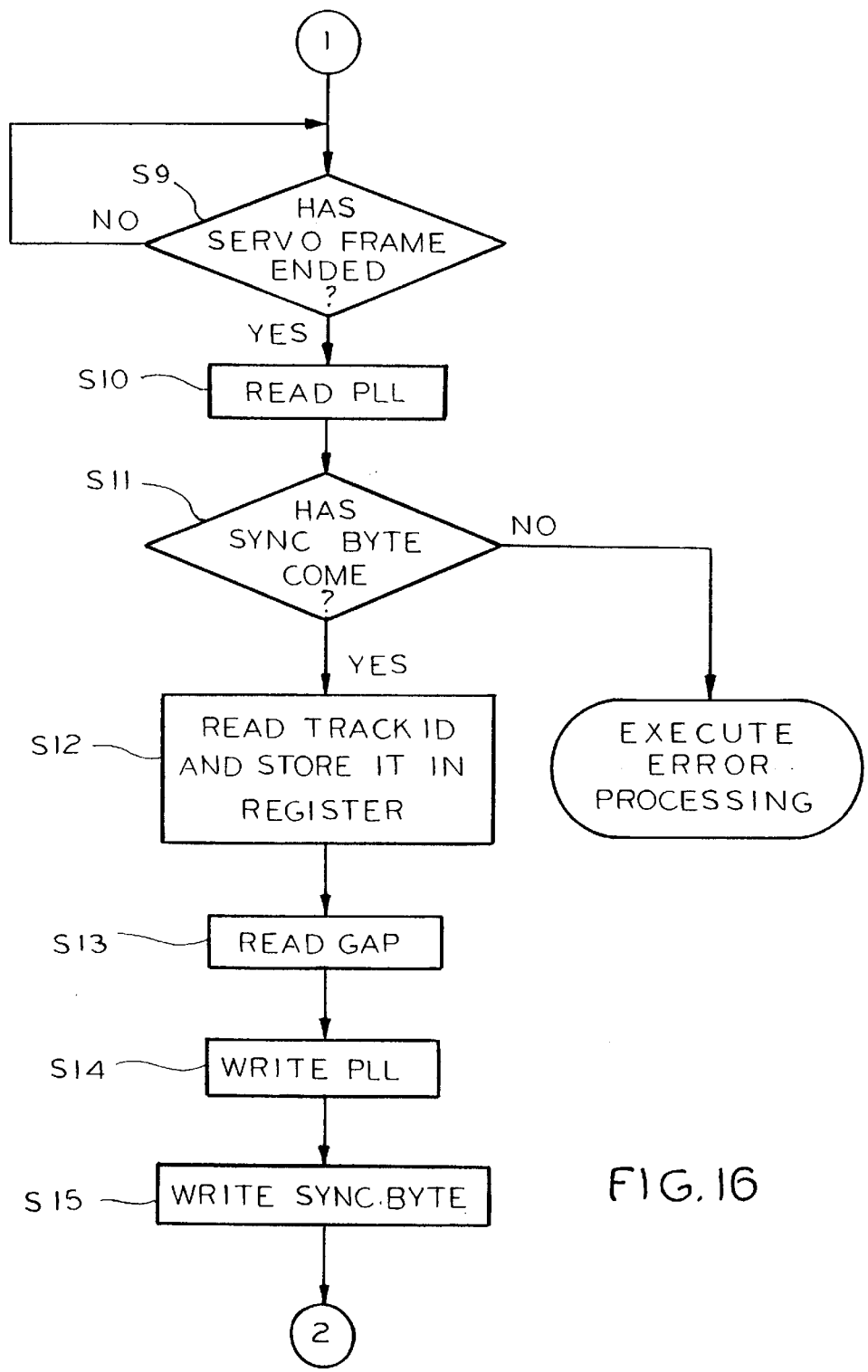
FIG. 16 is a continuation of the flowchart of FIG. 15 on writing in accordance with the present invention.

FIGS. 15 and 16 are flowcharts describing a writing operation by the formatter circuit 28 shown in FIG. 2. Assume that a head is controlled to be on-tracked on a target cylinder, sector pulses E7 are counted with an index pulse E8 as a start point, and it is checked at step S1 whether or not an intended sector pulse has come.

When an intended sector pulse indicating a sector on which a writing operation is performed is obtained, control is passed to step S2. A synchronization pattern is written in the PLL synchronization area within the data area 70. At step S3, a sync byte pattern is written in the sync byte area. At step S4, it is checked whether or not the servo frame 58 has come. If it has not come, one-byte data is written in the user data area 74.

Thereafter, at step S6, it is checked whether or not all data has been written. The processing of steps. S4 and S5 is repeated until all the data has been written. If it is found at step S6 that all the data has been written, an ECC code encoded from user data that has been written is written in the ECC area 76. Furthermore, a gap comparable to the pad area 78 is written at step S8. The writing operation by the formatter circuit 28 is then terminated.

During the foregoing writing operation, if it is judged at step S4 that the servo frame 58 has come, control is passed to step S9 in FIG. 16. At step S9, it is checked whether or not the servo frame has ended. If the end of the servo frame 58 is judged, control is passed to step S10. According to the timing of the start of the track ID area 62 after the passage of time corresponding to the length of a clock comparable to the gap 59, first, the PLL synchronization area 64 is read at step S10.

Thereafter, at step S11, if a sync byte in the sync byte area 65 is obtained normally, a track ID in the succeeding ID recording area 66 is read, stored in a register, and compared with a pre-set expected value. If they agree with each other, a writing operation for a data area is started.

Specifically, after the gap 68 is read at step S10, a synchronization pattern is written in the PLL synchronization area 72 at the start of the data area 70. At step S15, a sync byte is written in the succeeding sync byte area 73. Control is returned again to step S5 in FIG. 15. Data of one byte long is then written in the user data area 74.

If the sync byte in the sync byte area 65 within the track ID area 62 is not obtained normally at step S11, the track ID area 62 is defective. Error processing is then performed.

Figure 17:
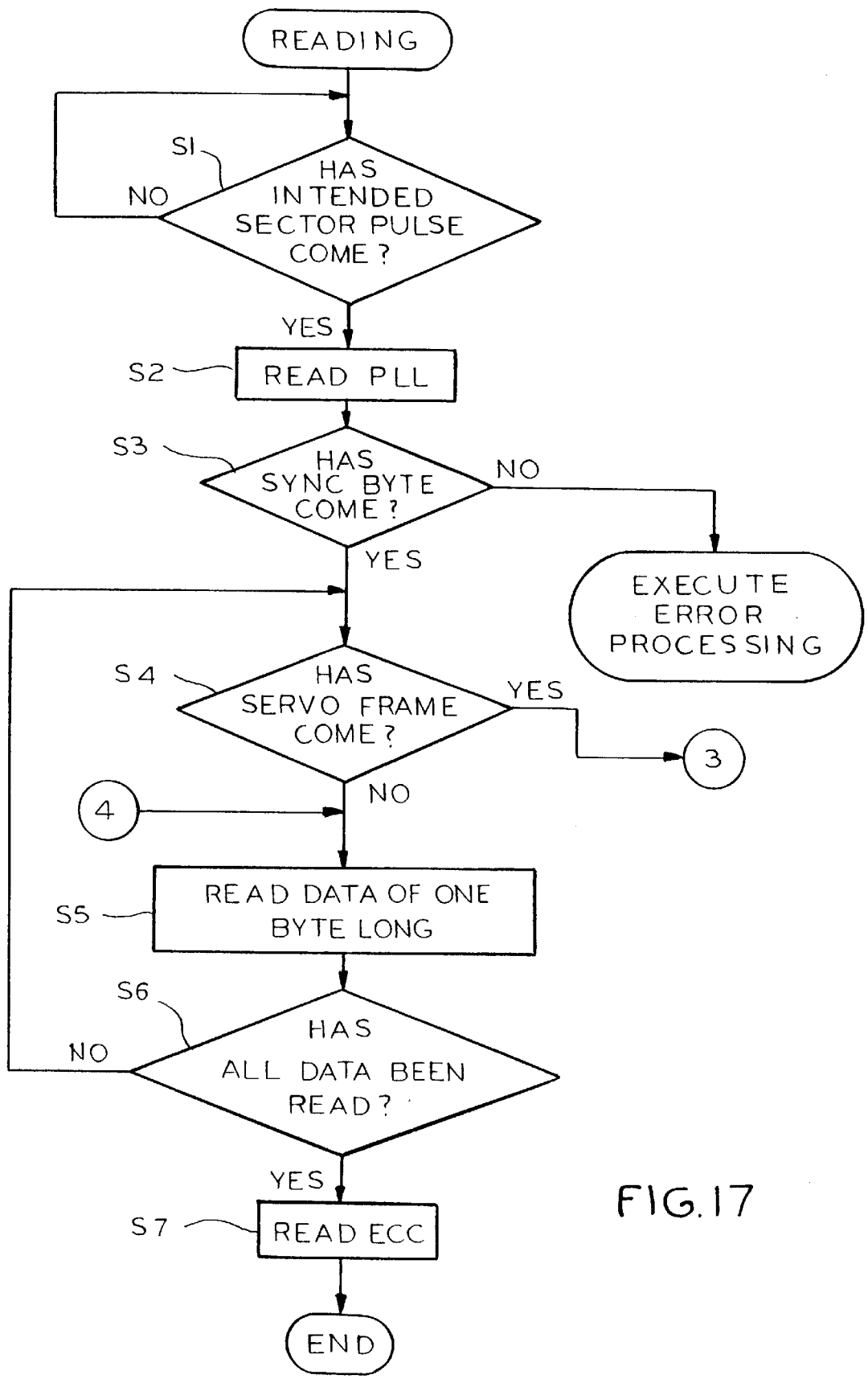
FIG. 17 is a flowchart on reading in accordance with the present invention.
Figure 18:
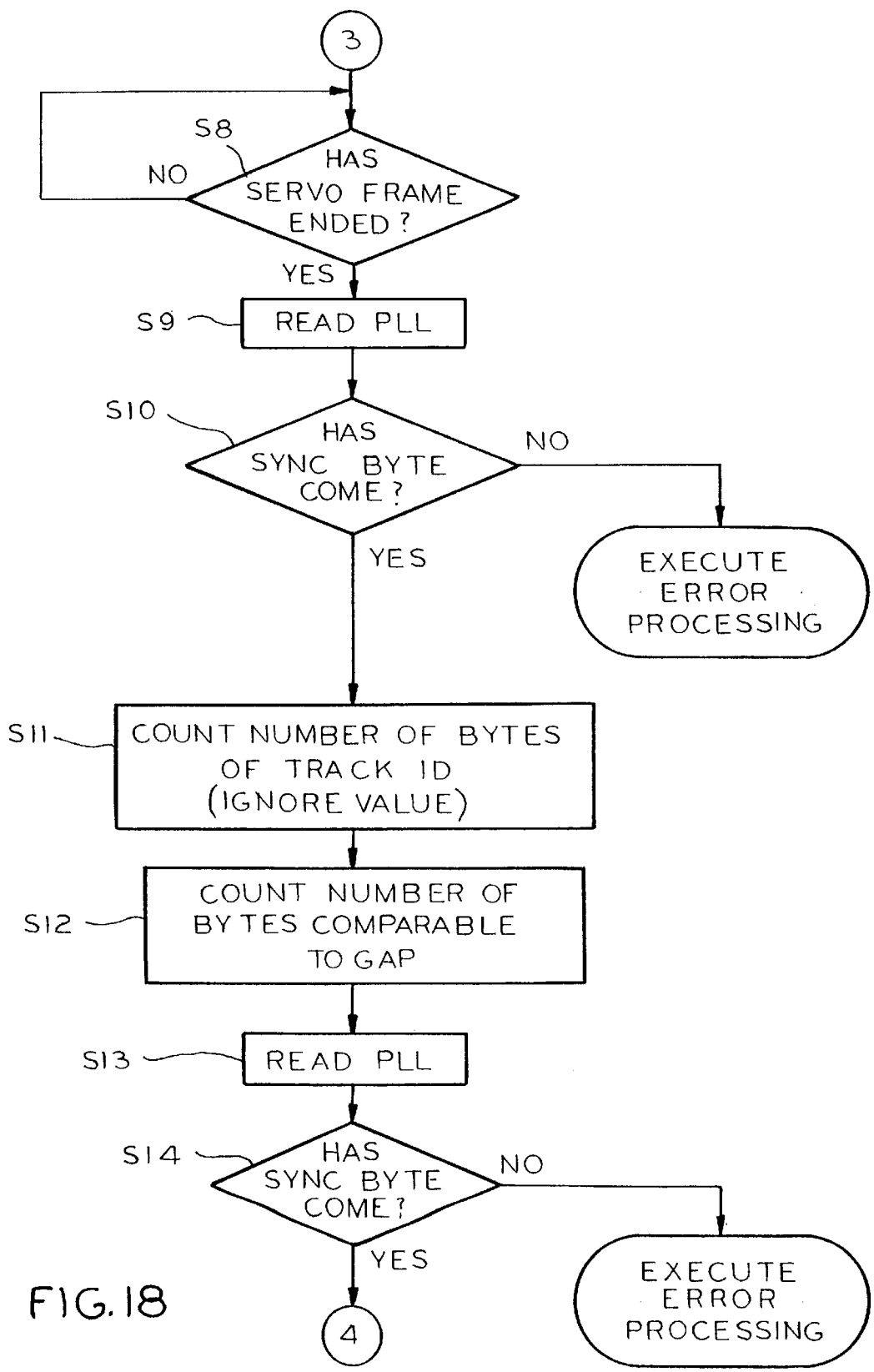
FIG. 18 is a continuation of the flowchart of FIG. 17 on reading in accordance with the present invention.

FIGS. 17 and 18 are flowcharts describing a reading operation by the formatter circuit 28 shown in FIG. 2. At step S1, on-tracking control is performed on a target cylinder. In this state, sector pulses E7 are counted with an index pulse E8 as a start point in order to check whether or not an intended sector pulse to be read has come. If an intended sector pulse is obtained, control is passed to step S2. A synchronization pattern in the PLL synchronization area at the start of the data area 70 is read. At step S7, a sync byte in the sync byte area 73 is checked for. If the sync byte is obtained normally, it is checked at step S4 whether or not the servo frame 58 has come. If the servo frame has not come, data in the user data area is read by one byte at step S5. At step S6, it is checked whether or not all data has been read. The processing of steps S4 and S5 is repeated until all the data has been read. When it is judged at step S6 that all the data has been read, an ECC code 76 in the ECC area is read at step S7.

By contrast, when the servo frame 58 comes during reading of the user data area 74, control is passed to step S8 in FIG. 18. It is then judged if the servo frame 58 has ended. The PLL synchronization area 64 at the start of the track ID area 62 is read. At step S10, a sync byte in the sync byte area 65 is checked for. If a sync byte is obtained normally, the number of bytes of a track ID recorded in the succeeding ID recording area 66 is counted at step S1.

That is to say, a track ID recorded in the track ID area 62 is not used but ignored during a reading operation. After the number of bytes comparable to the gap 68 is counted at step S12, the PLL synchronization area 72 at the start of the data area 70 is read at step S13. When a sync byte is identified at step S14, control is passed to step S5 in FIG. 17. The processing of reading data of one byte long is repeated.

FIG. 19 shows another embodiment of a track format in the disk unit of the present invention. Similarly to FIG. 6, FIG. 19 shows part of a track record. The track ID area 62 is recorded immediately following a servo frame 58'. The servo frame 58' is followed by the data area 70. In this embodiment, the servo frame 58' includes a gray code area 88. In the gray code area 88, gray codes G1 and G0 representing two low-order bits of a cylinder address are recorded.

The remaining high-order bit data of the cylinder address is recorded in the ID recording area 66 within the track ID area 62. Since a two-phase servo pattern that is recorded in the position detection area 86 has the same pattern repeated in units of four tracks, the two low-order bits of the cylinder address recorded as the gray codes G1 and G0 in the gray code area 88 are used as two-bit information indicating any of four patterns.

During a writing operation, two low-order bits of a cylinder address obtained from the gray code area 88 during-reading of the servo frame 58' are combined with the high-order bits of the cylinder address obtained during reading of the succeeding track ID area 62 in order to identify the cylinder address. If a current cylinder address is identified correctly, the cylinder address can be identified relatively merely by reading the two low-order bits of the cylinder address recorded in the gray code area 88 within the servo frame 58' using the current cylinder address as a reference.

Although gray codes G12 to G0 corresponding to a full cylinder address of, for example, 12 bits long have been placed in the gray code area 88 within the servo frame 58' in the past, the present invention requires only two codes of the gray codes G1 and G0 representing two low-order bits. The servo frame 58' can be shortened by the length comparable to the reduction in the number of gray codes. Formatting efficiency can therefore be improved.

FIG. 20 shows another embodiment of a track format of the present invention. Even in FIG. 20, part of a track record is shown. This embodiment is concerned with a phase servo proposed in U.S. Pat. Nos. 4,549,232 and 4,642,562 (corresponding to Japanese Unexamined Patent Publication No. 60-10472) as a servo pattern used for head position detection.

A servo frame 90 designed for a phase servo is composed of a training area 92, a marker area 94, and a position detection area 96 in which a phase servo pattern is recorded. In the training area 92, a timing signal used to synchronize a PLL circuit is recorded. The timing signal generates and records a reference clock used to detect a duty from a read signal of a phase servo pattern in the position detection area 96, with the rotation of a disk.

The timing signal in the training area 92 is detected in order to obtain a peak detection pulse of a constant cycle, whereby the PLL circuit is controlled according to an oscillatory frequency synchronous with the actual rotation of a disk. The marker area 94 fills the role of finalizing a specific position within the servo frame 90. Using the marker detection position as a reference, clocks generated by the PLL circuit are counted in order to accurately detect the timing of each servo frame.

The position detection area 96 is divided into a first field, a second field, a third field, and a fourth field. The first field is field EVEN1, the fourth field is field EVEN2, and the second field and third field are fields ODD. A pattern in which a phase shift is made in order to ensure a continuous increase toward the inner side of a disk in units of a given clock pitch determined with a reference clock, and a pattern in which a phase shift is made in order to ensure a continuous increase toward the opposite side or outer side thereof, are recorded.

The principles of position detection using a phase servo pattern are such that: a flip-flop (FF) is set with a reference clock; the FF is reset with a detection signal of a phase servo pattern read by a read head; the duty signal is detected per each of the first to fourth fields; a capacitor charging operation is performed in conjunction with the first to fourth fields; a capacitor discharging operation is performed in conjunction with the second and third fields; and the charges in the capacitor accumulated from the first field through the fourth field are used to express a position.

The servo frame 90 designed for the foregoing phase servo does not have track ID information such as a cylinder address from the beginning. A cylinder address is identified relatively on the basis of the repetition of any detected pattern of the phase servo pattern that is repeated in units of four cylinders.

The track ID area 62 immediately succeeding the servo frame 90 designed for a phase servo can be used as a track ID reading area for checking during a writing operation if a cylinder address is correct. Since the servo frame 90 used for a phase servo is thus followed by the track ID area 62, it can be checked if writing is performed at a correct cylinder address during a writing operation. The reliability of the writing operation can be improved.

The many advantages of this invention are now apparent. As described so far, according to the present invention, track ID information is removed from a servo area in an embedded servo, or part of the information is left in the servo area, whereby an area of a servo frame is minimized. Consequently, formatting efficiency can be improved, and the ratio of servo frames to a whole data side can be reduced in order to increase a storage capacity.

In particular, recording and reproducing based on PRML and 8/9 conversion which are adopted for normal data recording and reproducing are used for a track ID area, unlike a recording system used for a servo area. Compared with a case in which a track ID is placed in the servo area, the ratio of a track ID area to a data area can be minimized. As a result, track formatting efficiency can be improved.

While the principles of the invention have been described above in connection with specific apparatus and applications, it is to be understood that this description is made only by way of example and not as a limitation on the scope of the invention.

We claim:

1. A disk unit comprising:
    a disk medium having at least one data side which is divided into a plurality of information areas each having a servo area and a data area in a track direction, said data area having a plurality of data blocks and a track ID area in which track information including a first part of a cylinder address is recorded immediately following each said servo area, said servo area having a track ID area that has only a second part of a cylinder address;
    a servo demodulation circuit for demodulating head position information from a read signal recorded in said servo area;
    a write data modulation circuit for modulating write data and writing it in said data area; and
    a formatter circuit that allows said write data modulation circuit to write track information in said track ID area within said data area during track formatting, and allows said read data demodulation circuit to read data from said track ID area within said data area and to detect track information for writing or reading.

2. A disk unit according to claim 1 wherein:
    said servo area includes a recovery area used to switch between reading and writing, a servo mark area in which a servo mark indicating a servo area is recorded, an area in which an AGC pattern used for AGC control of a read signal is recorded, and a position detection area in which a two-phase servo pattern used to detect a head position is recorded; and
    said track ID area of said data area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

3. A disk unit according to claim 1 wherein said second part of said cylinder address includes gray codes representing low-order bits of said cylinder address and said first part of said cylinder address includes remaining bit data, said gray codes being recorded in said second track ID area and said remaining bit data being recorded in said track ID area within said data area.

4. A disk unit according to claim 1 wherein:
    said servo area includes a training area in which a synchronization pattern used to synchronize a read signal in phase with a reference clock oscillator is recorded, a marker area in which a marker indicating a specific position within said servo area is recorded, and a position detection area in which a phase servo pattern is recorded; and
    said track ID area within said data area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

5. A disk unit according to claim 1 further comprising a head unit having a write head, and a read head disposed a certain distance from said write head with respect to the center of a track which defines a mismatch of a center of said write head relative to a center of said read head,
    wherein said formatter circuit off-tracks said write head toward said read head by the magnitude of said mismatch, so that said write head is then aligned to write said track information.

6. A disk unit according to claim 5 wherein when formatting a plurality of tracks sequentially, said formatter circuit positions a head unit on a track to be formatted, measures the magnitude of said mismatch, off-tracks said write head toward said read head by said measured magnitude of said mismatch, and then writes track information in said track ID area.

7. A disk unit according to claim 6 wherein measurement of the magnitude of said mismatch by said formatter circuit is such that: first, a write head is used to write measurement data on a track; then said write head is changed into a read head; an off-track is varied in units of a very small magnitude, and the magnitude of an offtrack detected when a read signal of a peak value is obtained is measured as the magnitude of the mismatch.

8. A disk medium having at least one data side which is divided into servo-area and data area units, each said data area unit having a plurality of data blocks, wherein a track ID area having track information including a first part of a cylinder address is located in the data area associated with each said servo area, and each said servo area includes a track ID area in which only a second part of said cylinder address is recorded.

9. A disk medium according to claim 8 wherein:

said servo area includes a recovery area used to switch between reading and writing, a servo mark area in which a servo mark indicating a servo area is recorded, an area in which an AGC pattern used for AGC control of a read signal is recorded, and a position detection area in which a two-phase servo pattern used to detect a head position is recorded; and said track ID area within said data area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

10. A disk medium according to claim 8 wherein said track information is a cylinder address divided into gray codes representing low-order bits of said track address and remaining bit data of said track address, said gray codes being recorded on said track ID area within said servo area and said remaining bit data being recorded on said track ID area within said data area.

11. A disk medium according to claim 8 wherein said servo area includes a training area in which a synchronization pattern used to synchronize in phase a reference clock oscillator in a disk unit with a read signal is recorded, a marker area in which a marker indicating a specific position within said servo area is recorded, and a position detection area in which a phase servo pattern is recorded, and said track ID area within said data area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

12. A disk medium according to claim 8 further comprising a head unit having a write head, and a read head disposed a certain distance from said write head, said distance defining a magnitude of a mismatch, wherein said track identification information is recorded by off-tracking a write head toward a read head with respect to the center of a track by the magnitude of said mismatch.

13. A disk unit comprising:

a disk medium having at least one data side which is divided into a plurality of information areas each having a servo area and a data area in a track direction, said data area having a track ID area in which track information including a cylinder address is recorded immediately following each said servo area, said track information only being recorded in each said data area;

a servo demodulation circuit for demodulating head position information from a read signal recorded in said servo area;

a write data modulation circuit for modulating write data and writing it in said data; and a formatter circuit that allows said write data modulation circuit to write track information in said track ID area during track formatting, and allows said read data demodulation circuit to read data from said track ID area and to detect track information for writing or reading.

14. A disk unit according to claim 13 wherein:

said servo area includes a recovery area used to switch between reading and writing, a servo mark area in which a servo mark indicating a servo area is recorded, an area in which an AGC pattern used for AGC control of a read signal is recorded, and a position detection area in which a two-phase servo pattern used to detect a head position is recorded; and said track ID area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

15. A disk unit according to claim 13 wherein:

said servo area includes a training area in which a synchronization pattern used to synchronize a read signal in phase with a reference clock oscillator is recorded, a marker area in which a marker indicating a specific position within said servo area is recorded; and a position detection area in which a phase servo pattern is recorded; and said track ID area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

16. A disk unit according to claim 13 further comprising a head unit having a write head, and a read head disposed a certain distance from said write head with respect to the center of a track which defines a mismatch of a center of said write head relative to a center of said read head, wherein said formatter circuit off-tracks said write head toward said read head by the magnitude of said mismatch, so that said write head is then aligned to write said track information.

17. A disk unit according to claim 16 wherein when formatting a plurality of tracks sequentially, said formatter circuit positions a head unit on a track to be formatted, measures the magnitude of said mismatch, off-tracks said write head toward said read head by said measured magnitude of said mismatch, and then writes track information in said track ID area.

18. A disk unit according to claim 17 wherein measurement of the magnitude of said mismatch by said formatter circuit is such that: first, a write head is used to write measurement data on a track; then said write head is changed into a read head; an off-track is varied in units of a very small magnitude, and the magnitude of an off-track detected when a read signal of a peak value is obtained is measured as the magnitude of the mismatch.

19. A disk medium having at least one data side which is divided into servo area and data area units, wherein a track ID area having track information including a cylinder address is recorded only in the data area associated with each said servo area.

20. A disk medium according to claim 19 wherein:

said servo area includes a recovery area used to switch between reading and writing, a servo mark area in which a servo mark indicating a servo area is recorded, an area in which an AGC pattern used for AGC control of a read signal is recorded, and a position detection area in which a two-phase servo pattern used to detect a head position is recorded; and said track ID area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

21. A disk medium according to claim 19 wherein said servo area includes a training area having a synchronization pattern used to synchronize in phase a reference clock oscillator in a disk unit with a read signal is recorded, a marker area in which a marker indicating a specific position within said servo area is recorded, and a position detection area in which a phase servo pattern is recorded, and said track ID area includes a PLL synchronization control area used to synchronize the oscillatory frequency of a read clock with the rotation of a disk, a sync byte area in which a synchronization pattern used to synchronize read data with said read clock is recorded, and a track information recording area in which track address information is recorded.

22. A disk medium according to claim 19 further comprising a head unit having a write head, and a read head disposed a certain distance from said write head, said distance defining a magnitude of a mismatch, wherein said track identification information is recorded by off-tracking a write head toward a read head with respect to the center of a track by the magnitude of said mismatch.

* * * * *